United States Patent
Segawa

(12) 
(10) Patent No.: US 11,867,264 B2
(45) Date of Patent: Jan. 9, 2024

(54) BALL SCREW DEVICE AND METHOD FOR MANUFACTURING SAME

(71) Applicant: NSK LTD., Tokyo (JP)

(72) Inventor: Ryo Segawa, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/030,012

(22) PCT Filed: Apr. 11, 2022

(86) PCT No.: PCT/JP2022/017477
§ 371 (c)(1),
(2) Date: Jun. 29, 2023

(87) PCT Pub. No.: WO2022/220215
PCT Pub. Date: Oct. 20, 2022

(65) Prior Publication Data
US 2023/0383826 A1 Nov. 30, 2023

(30) Foreign Application Priority Data
Apr. 15, 2021 (JP) .................................. 2021-069331

(51) Int. Cl.
*F16H 25/24* (2006.01)
*F16H 25/22* (2006.01)

(52) U.S. Cl.
CPC ......... *F16H 25/24* (2013.01); *F16H 25/2204* (2013.01); *F16H 2025/2481* (2013.01)

(58) Field of Classification Search
CPC ... F16H 25/2454; F16H 25/24; F16H 25/2472
See application file for complete search history.

(56) References Cited

U.S. PATENT DOCUMENTS 11,506,267 B2 * 11/2022 Peric .................. F16H 25/2015
2011/0011191 A1 1/2011 Osterlaenger et al.

FOREIGN PATENT DOCUMENTS

JP 2016-070281 A 5/2016

OTHER PUBLICATIONS

International Search Report for PCT/JP2022/017477 dated Jun. 21, 2022.
Notice of Reasons for Refusal for Japanese Application No. 2022-555693 dated Nov. 18, 2022.

* cited by examiner

*Primary Examiner* — Randell J Krug
(74) *Attorney, Agent, or Firm* — Sughrue Mion, PLLC

(57) ABSTRACT

A ball screw device comprising: a screw shaft, a nut, balls arranged between the shaft-side ball thread groove and the nut-side ball thread groove, a stopper including: a boss portion fitted to the fitting shaft portion of the screw shaft, and a second engaging portion protruding in the radial direction from the boss portion and engageable with a first engaging portion of the nut in the circumferential direction, and a holding member arranged adjacent to one side in the axial direction of the stopper, such that an axial load can be transmitted between the screw portion of the screw shaft and the holding member through the stopper without applying a moment to the stopper.

14 Claims, 23 Drawing Sheets

ONE SIDE IN THE AXIAL DIRECTION

OTHER SIDE IN THE AXIAL DIRECTION

ONE SIDE IN THE AXIAL DIRECTION

OTHER SIDE IN THE AXIAL DIRECTION

BALL SCREW DEVICE AND METHOD FOR MANUFACTURING SAME

This Application is a National Stage of International Application No. PCT/JP2022/017477 filed Apr. 11, 2022, claiming priority based on Japanese Patent Application No. 2021-069331 filed Apr. 15, 2021.

TECHNICAL FIELD

The present invention relates to a ball screw device and a method for manufacturing the same.

BACKGROUND ART

A ball screw device is provided with balls which perform rolling motion between a screw shaft and a nut, and thus has a higher efficiency than a sliding screw device in which a screw shaft is in direct contact with a nut. Therefore, in order to convert rotational motion of a driving source such as an electric motor to linear motion, the ball screw device is assembled in various mechanical devices such as an electric braking device and an automatic manual transmission (AMT) of an automobile, a positioning device of a machine tool, and the like.

The ball screw device includes a screw shaft having a shaft-side ball thread groove having a spiral shape on the outer-circumferential surface, a nut having a nut-side ball thread groove having a spiral shape on the inner-circumferential surface, and a plurality of balls arranged between the shaft-side ball thread groove and the nut-side ball thread groove. The ball screw device uses either one of the screw shaft or the nut as a rotational motion element and the other of the screw shaft and the nut as a linear motion element, depending on the application.

In the ball screw device, the stroke end of the linear motion element is regulated in order to prevent the linear motion element from linearly moving beyond a predetermined range. FIG. 22 illustrates a ball screw device 100 having a conventional structure for regulating the stroke end of the linear motion element described in JP 2016-070281A.

The ball screw device 100 includes a screw shaft 101, a nut 102, a plurality of balls (not illustrated), and a stopper 103.

The screw shaft 101 has a screw portion 104 and a fitting shaft portion 105 arranged adjacent to one side in the axial direction of the screw portion 104. The screw portion 104 has a shaft-side ball thread groove 106 having a spiral shape on the outer-circumferential surface. The fitting shaft portion 105 has an outer diameter smaller than that of the screw portion 104, and has male spline teeth on the outer-circumferential surface at a plurality of locations evenly spaced in the circumferential direction. The screw shaft 101 is arranged coaxially with the nut 102 in a state where the screw portion 104 is inserted inside the nut 102.

The nut 102 has a cylindrical shape, and has a nut-side ball thread groove having a spiral shape and a circulation groove having a substantially S-shape on the inner-circumferential surface (not illustrated). The nut 102 has a first engaging portion 107 at an end portion on the one side in the axial direction.

The shaft-side ball thread groove 106 and the nut-side ball thread groove are arranged so as to face each other in the radial direction to form a load path having a spiral shape. The start point and the end point of the load path are connected by the circulation groove formed on the inner-circumferential surface of the nut 102. Therefore, the balls that have reached the end point of the load path are returned to the start point of the load path through the circulation groove. Here, the start point and the end point of the load path are interchanged depending on the direction of relative displacement in the axial direction between the screw shaft 101 and the nut 102.

The stopper 103 has a boss portion 108 having an annular shape and a second engaging portion 109 having a projection shape. The boss portion 108 is externally fitted to the fitting shaft portion 105 of the screw shaft 101 so as not to be able to rotate relative to the fitting shaft portion 105. Specifically, the boss portion 108 is externally fitted to the fitting shaft portion 105 so as not to be able to rotate relative to the fitting shaft portion 105 by spline-engaging female spline teeth formed on the inner-circumferential surface with the male spline teeth formed on the outer-circumferential surface of the fitting shaft portion 105. The second engaging portion 109 protrudes in the radial direction from a part in the circumferential direction of the outer-circumferential surface of the boss portion 108.

In the ball screw device 100 having a conventional structure, when the linear motion element of either the screw shaft 101 or the nut 102 linearly moves and reaches the stroke end, the first engaging portion 107 provided in the nut 102 and the second engaging portion 109 provided in the stopper 103 engage in the circumferential direction. As a result, rotation of the rotational motion element of either the screw shaft 101 or the nut 102 is prevented, and it becomes possible to regulate the stroke end of the linear motion element.

CITATION LIST

Patent Literature

Patent Literature 1: JP 2016-070281A

SUMMARY OF INVENTION

Technical Problem

In the ball screw device 100 having a conventional structure described in JP 2016-070281A, the stopper 103 is used only for regulating the stroke end of the linear motion element.

In recent years, the application of ball screw devices has diversified, and a mode of use is being studied in which a stopper is arranged so as to be held in the axial direction between a screw portion and a holding member such as a driving member to transmit an axial load between the screw portion and the holding member.

However, in the ball screw device 100 having a conventional structure, each of the side surfaces on both sides in the axial direction of the stopper 103 is formed in a flat surface. In other words, the side surfaces in the axial direction of the boss portion 108 and the side surfaces in the axial direction of the second engaging portion 109 are positioned on the same plane.

As a result, for example, when an axial load is transmitted from a side surface on one side in the axial direction of the stopper 103 to the holding member, the entire side surface on the one side in the axial direction of the stopper 103, including a side surface on the one side in the axial direction of the second engaging portion 109, contacts the holding member. Since the second engaging portion 109 is provided only on a part in the circumferential direction of the outer-circumferential surface of the boss portion 108, a contact surface of the stopper 103 with respect to the holding member is a rotationally asymmetrical shape in relation to the center axis of the stopper 103. Due to this, there is a possibility that an unbalanced load or moment load may be applied to the stopper 103.

Specifically, as illustrated in FIG. 23, when an axial load is transmitted from a side surface on the one side in the axial direction of the stopper 103 to a holding member (not illustrated), the distance (moment length) L1 from the center axis O of the stopper 103 to the load acting point A on the half portion on one side in the radial direction of the stopper 103 including the second engaging portion 109 (upper half portion in FIG. 23) is longer than the distance L2 from the center axis O of the stopper 103 to the load acting point B on the half portion on the other side in the radial direction of the stopper 103 (lower half portion in FIG. 23) (L1>L2). Therefore, when the axial load distribution is converted into a concentrated load, the line of action of the concentrated load shifts from the center axis O of the stopper 103 in the radial direction. As a result, a moment in the direction indicated by the arrow X in FIG. 23 acts on the stopper 103.

When a moment acts on the stopper 103, the screw shaft 101 to which the stopper 103 is externally fitted is likely to be inclined, and it becomes difficult to evenly apply the load to the balls rolling on the load path. As a result, the life of the ball screw device 100 may be shortened.

The present invention has been made to solve the above problems, and the objective of the present invention is to provide a ball screw device capable of transmitting an axial load between the screw portion and the holding member without shortening the life of the ball screw device.

Solution to Problem

The ball screw device of one aspect of the present invention comprises a screw shaft, a nut, balls, a stopper, and a holding member.

The screw shaft includes a screw portion having a shaft-side ball thread groove having a spiral shape on an outer-circumferential surface thereof, and a fitting shaft portion having an outer diameter smaller than that of the screw portion and arranged adjacent to one side in an axial direction of the screw portion.

The nut includes a nut-side ball thread groove having a spiral shape on an inner-circumferential surface thereof, and a first engaging portion at an end portion on the one side in the axial direction.

The balls are arranged between the shaft-side ball thread groove and the nut-side ball thread groove.

The stopper includes a boss portion externally fitted to the fitting shaft portion so as not to be relatively rotated, and a second engaging portion protruding in a radial direction from an outer-circumferential surface of the boss portion and capable of engaging with the first engaging portion in a circumferential direction.

The holding member is arranged adjacent to the one side in the axial direction of the stopper such that the stopper is held between the holding member and the screw portion in the axial direction.

The ball screw device of one aspect of the present invention transmits an axial load between the screw portion and the holding member through the stopper without applying a moment to the stopper.

In the ball screw device of one aspect of the present invention, the stopper may have a first contact surface on a side surface on the one side in the axial direction, the first contact surface configured by a flat surface existing on a virtual plane perpendicular to a center axis of the stopper, having a rotationally symmetrical shape in relation to the center axis of the stopper, and contacting the holding member. The stopper also may have a second contact surface on a side surface on the other side in the axial direction, the second contact surface configured by a flat surface existing on a virtual plane perpendicular to the center axis of the stopper, having a rotationally symmetrical shape in relation to the center axis of the stopper, and contacting the screw portion.

In the ball screw device of one aspect of the present invention, the first contact surface can be configured by a side surface on the one side in the axial direction of the boss portion, and the second contact surface can be configured by a side surface on the other side in the axial direction of the boss portion.

In the ball screw device of one aspect of the present invention, a side surface on the one side in the axial direction of the second engaging portion can be arranged so as to be shifted in the axial direction to the other side in the axial direction with respect to the side surface on the one side in the axial direction of the boss portion, and a side surface on the other side in the axial direction of the second engaging portion can be arranged so as to be shifted in the axial direction to the one side in the axial direction with respect to the side surface on the other side in the axial direction of the boss portion.

In this case, the side surface on the one side in the axial direction of the second engaging portion can be connected to the side surface on the one side in the axial direction of the boss portion through a stepped portion having an arc-shaped cross section, and the side surface on the other side in the axial direction of the second engaging portion can be connected to the side surface on the other side in the axial direction of the boss portion through a stepped portion having an arc-shaped cross section.

Alternatively or additionally, the amount of positional deviation of the side surface on the one side in the axial direction of the second engaging portion toward the other side in the axial direction with respect to the side surface on the one side in the axial direction of the boss portion and the amount of positional deviation of the side surface on the other side in the axial direction of the second engaging portion toward the one side in the axial direction with respect to the side surface on the other side in the axial direction of the boss portion can be the same. In other words, the side surface on the one side in the axial direction and the side surface on the other side in the axial direction of the stopper can be configured so as to be mirror symmetrical.

In the ball screw device of one aspect of the present invention, the thickness in the axial direction of the second engaging portion can be constant over the radial direction.

Alternatively, the thickness in the axial direction of the second engaging portion can be made smaller toward outside in the radial direction.

In the ball screw device of one aspect of the present invention, of both side surfaces in the circumferential direction of the second engaging portion, a side surface on a side that engages with the first engaging portion in the circumferential direction can be smoothly connected to the outer-circumferential surface of the boss portion through a concave curved surface having an arc-shaped contour when viewed from the axial direction, and of the both side surfaces in the circumferential direction of the second engaging portion, a side surface on a side that does not engage with the first engaging portion in the circumferential direction can be connected to the outer-circumferential surface of the boss portion in a tangential direction thereof when viewed from the axial direction.

In the ball screw device of one aspect of the present invention, the fitting shaft portion can have a width across flat shape having a pair of flat outer surfaces parallel to each other on an outer-circumferential surface thereof, and the boss portion can have an engaging hole which has a width across flat shape having a pair of flat inner surfaces parallel to each other on an inner-circumferential surface thereof.

Alternatively, the fitting shaft portion may have male spline teeth on an outer-circumferential surface thereof, and the boss portion may have an engaging hole having female spline teeth on an inner-circumferential surface thereof.

In the ball screw device of one aspect of the present invention, the stopper can be loosely externally fitted to the fitting shaft portion so as to allow relative displacement in the axial direction, and the holding member can be externally fitted to the screw shaft, for example to the fitting shaft portion, by press fitting.

Alternatively, the stopper may be externally fitted to the fitting shaft portion by press fitting, and the holding member may be externally fitted to the screw shaft, for example, the fitting shaft portion by press fitting.

In the ball screw device of one aspect of the present invention, the screw shaft may be a rotational motion element that rotationally moves during use, the nut may be a linear motion element that linearly moves during use, and the holding member may be a driving member that rotationally drives the screw shaft or a rolling bearing that rotatably supports the screw shaft. In this case, the driving member may be configured by a gear, pulley, sprocket, or motor shaft.

Alternatively, in the ball screw device of one aspect of the present invention, the screw shaft may be a linear motion element that linearly moves during use, the nut may be a rotational motion element that rotationally moves during use, and the holding member may be a piston that linearly moves together with the screw shaft.

A manufacturing method of a ball screw device of one aspect of the present invention is a manufacturing method of a ball screw device of one aspect of the present invention, the manufacturing method including a process of manufacturing the stopper, the process comprising steps of performing a forging process to a material to form an intermediate material having an approximate shape of the stopper, and machining each of side surfaces on both sides in an axial direction of the intermediate material to obtain the stopper.

The process of manufacturing the stopper preferably comprises step of performing a forging process to a material to form an intermediate material which has an approximate shape of the stopper and provided with side surfaces on both sides in an axial direction thereof, the side surfaces having a rotationally symmetrical shape, and machining each of the side surfaces on both sides in the axial direction of the intermediate material to form the first contact surface and the second contact surface.

[Advantageous Effect of Invention]

In the ball screw device of the present invention, since an axial load can be transmitted between the screw portion and the holding member through the stopper without applying a moment to the stopper, it is possible to transmit the axial load between the screw portion and the holding member without shortening the life of the ball screw device.

First Example

Figure 1:
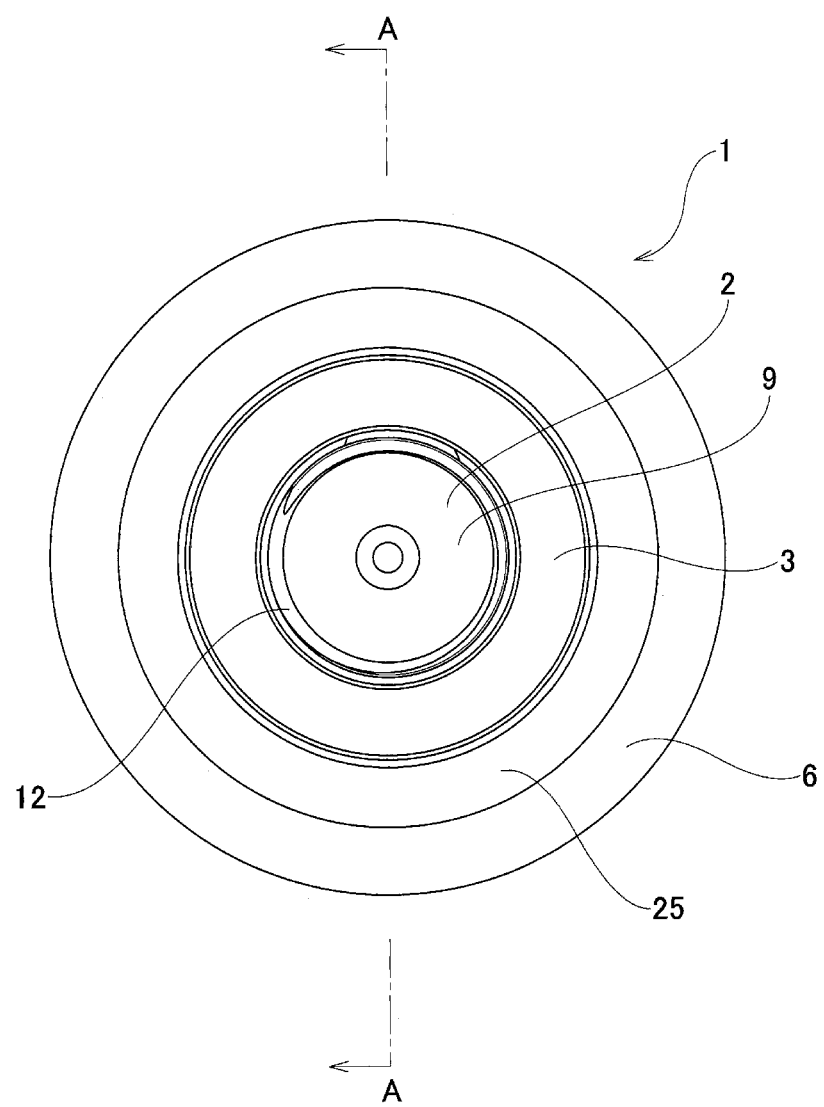
FIG. 1 is a front view of a ball screw device of a first example of an embodiment of the present invention as viewed from the axial direction.
Figure 2:
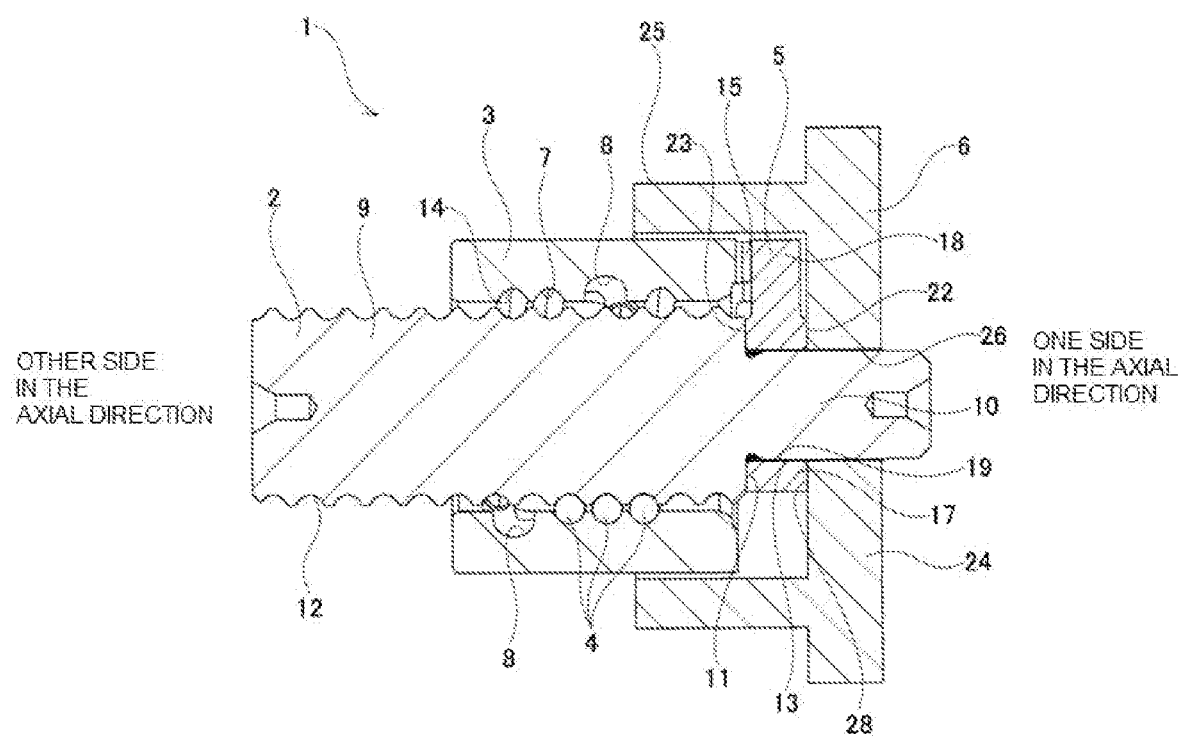
FIG. 2 is a cross-sectional view of section A-A in FIG. 1.
Figure 3:
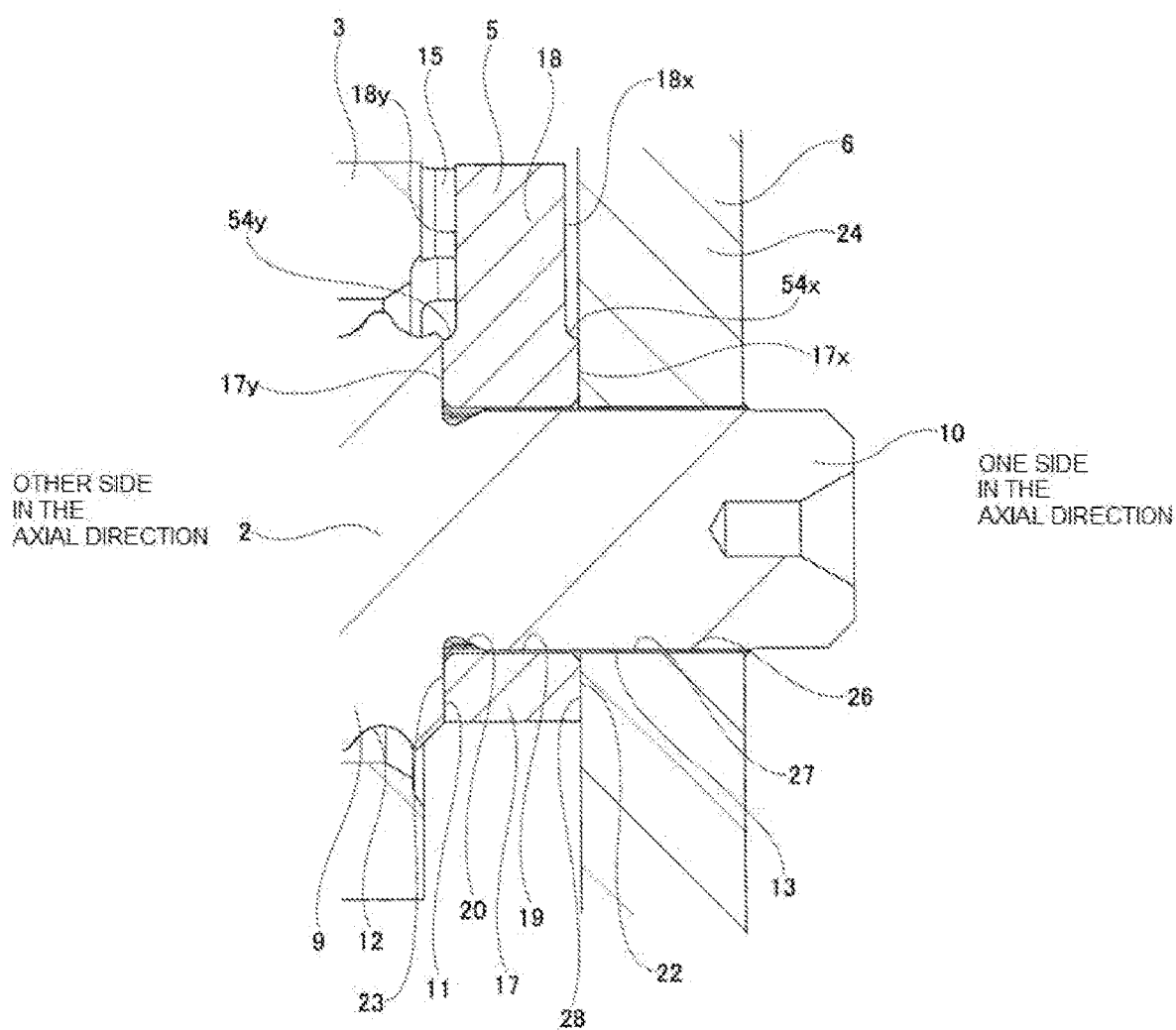
FIG. 3 is a partially enlarged view of FIG. 2.
Figure 4:
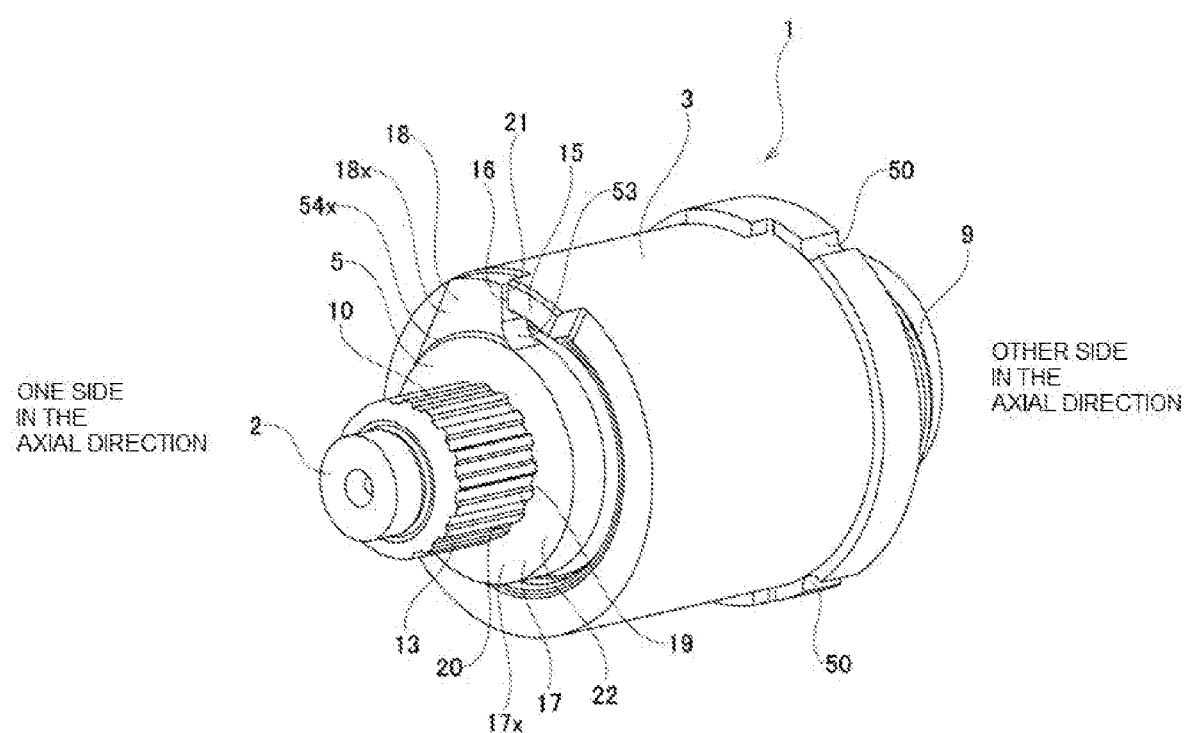
FIG. 4 is a perspective view of the ball screw device of the first example with the driving member omitted.

FIGS. 1 to 7 show a first example of an embodiment of the present invention.

[Overall Configuration of Ball Screw Device]

The ball screw device 1 of this example is incorporated in, for example, an electric booster device and is used for applications such as converting rotational motion of an electric motor, which is a driving source, into linear motion to operate a piston of a hydraulic cylinder.

The ball screw device 1 includes a screw shaft 2, a nut 3, balls 4, a stopper 5, and a driving member 6 corresponding to a holding member. In the ball screw device 1 of this example, the screw shaft 2 configures a rotational motion element that rotates during use, and the nut 3 configures a linear motion element that linearly moves during use. That is, the ball screw device 1 of this example is used in an aspect in which the screw shaft 2 is rotationally driven and the nut 3 is linearly moved.

The screw shaft 2 is inserted inside the nut 3 and arranged coaxially with the nut 3. A load path 7 having a spiral shape is provided between the outer-circumferential surface of the screw shaft 2 and the inner-circumferential surface of the nut 3. Balls 4 are arranged in the load path 7 so as to be able to roll. When the screw shaft 2 and the nut 3 are relatively rotated, the balls 4 that have reached the end point of the load path 7 are returned to the start point of the load path 7 through a circulation groove 8 formed on the inner-circumferential surface of the nut 3. The structures of the respective components of the ball screw device 1 will be described below.

In the following description, the axial direction, the radial direction, and the circumferential direction mean, unless specified otherwise, the axial direction, the radial direction, and the circumferential direction in relation to the screw shaft. Further, one side in the axial direction is referred to as the right side in FIG. 2, FIG. 3 and FIG. 6, and the left side in FIG. 4, and the other side in the axial direction is referred to as the left side in FIG. 2, FIG. 3 and FIG. 6, and the right side in FIG. 4.

[Screw Shaft]

The screw shaft 2 is made of metal and has a screw portion 9 and a fitting shaft portion 10 arranged adjacent to the one side in the axial direction of the screw portion 9. The screw portion 9 and the fitting shaft portion 10 are coaxially arranged and integrally configured with each other. The fitting shaft portion 10 has an outer diameter smaller than that of the screw portion 9. Therefore, the screw shaft 2 has a stepped surface 11 facing the one side in the axial direction between the screw portion 9 and the fitting shaft portion 10. In the illustrated example, the stepped surface 11 is configured by a side surface on the one side in the axial direction of the screw portion 9, that is, a flat surface that exists on a virtual plane perpendicular to the center axis of the screw shaft 2.

The screw portion 9 has a shaft-side ball thread groove 12 having a spiral shape on the outer-circumferential surface. The shaft-side ball thread groove 12 is formed by performing a griding process, cutting process, or a rolling process to the outer-circumferential surface of the screw portion 9. In this example, the number of threads of the shaft-side ball thread groove 12 is one. The shaft-side ball thread groove 12 has a groove shape of a Gothic arch shape or a circular arc shape.

The fitting shaft portion 10 has male spline teeth 13 on the outer-circumferential surface. The male spline teeth 13 are arranged at a plurality of locations evenly spaced in the circumferential direction on the outer-circumferential surface of the fitting shaft portion 10. That is, the fitting shaft portion 10 is configured by a spline shaft portion. In the illustrated example, each of the male spline teeth 13 is configured by an involute spline tooth, but it can also be configured by an angular spline tooth or serration.

The screw shaft 2 is arranged coaxially with the nut 3 in a state where the screw portion 9 is inserted inside the nut 3. In this example, the screw shaft 2 is configured by the screw portion 9 and the fitting shaft portion 10, however, in a case of implementing the present invention, it is possible to provide the screw shaft with a second fitting shaft portion or the like for fixing a rolling bearing or the like for rotatably supporting the screw shaft with respect to a housing or the like.

[Nut]

The nut 3 is made of metal and is configured to be cylindrical as a whole. The nut 3 has a nut-side ball thread groove 14 having a spiral shape and a circulation groove 8 on the inner-circumferential surface.

The nut-side ball thread groove 14 has a spiral shape. The nut-side ball thread groove 14 is formed by performing, for example. a griding process, a cutting process, a rolling tapping process, or a cutting tapping process to the inner-circumferential surface of the nut 3. The nut-side ball thread groove 14 has the same lead as the shaft-side ball thread groove 12. Therefore, in a state where the screw portion 9 of the screw shaft 2 is inserted inside the nut 3, the shaft-side ball thread groove 12 and the nut-side ball thread groove 14 are arranged so as to face each other in the radial direction to form the load path 7 having a spiral shape. The number of threads of the nut-side ball thread groove 14 is one, as the same as that of the shaft-side ball thread groove 12. The nut-side ball thread groove 14 has a groove shape of Gothic arch or circular arc as the same as the shaft-side ball thread groove 12.

The circulation groove 8 has a substantially S-shape. The circulation groove 8 is formed on the inner-circumferential surface of the nut 3 by a cold forging process, for example. The circulation groove 8 smoothly connects axially adjacent portions of the nut-side ball thread groove 14 and connects the start point and the end point of the load path 7. Therefore, the balls 4 that have reached the end point of the load path 7 are returned to the start point of the load path 7 through the circulation groove 8. Here, the start point and the end point of the load path are interchanged depending on the direction of relative displacement in the axial direction between the screw shaft 2 and the nut 3, in other words, depending on the direction of relative rotation between the screw shaft 2 and the nut 3.

The circulation groove 8 has a semi-circular cross-sectional shape. The circulation groove 8 has a groove width slightly larger than the diameter of the balls 4 and a groove depth that allows the balls 4 moving in the circulation groove 8 to climb over the threads of the shaft-side ball thread groove 12.

The nut 3 has a first engaging portion 15 at an end portion on the one side in the axial direction. The first engaging portion 15 is provided in a part in the circumferential direction of an end portion on the one side in the axial direction of the nut 3 and protrudes toward the one side in the axial direction from the cylindrical body portion. The first engaging portion 15 has a fan column shape and has a protruding amount in the axial direction that is approximately the same as the thickness dimension in the axial direction of the stopper 5. The first engaging portion 15 has a first stopper surface 16 on a side surface on one side in the circumferential direction (left side surface in FIG. 4). The first stopper surface 16 is arranged so as to be substantially parallel to the center axis of the nut 3. In the illustrated example, the nut 3 is configured integrally as a whole including the first engaging portion 15. However, in a case of implementing the present invention, the nut can be configured by a cylindrical body portion having a nut-side ball thread groove on the inner-circumferential surface and a first engaging portion configured separately from the body portion and fixed to the body portion.

The ball screw device 1 of this example uses the nut 3 as a linear motion element. Therefore, in this example, an anti-rotation mechanism (not illustrated) is used to prevent the nut 3 from rotating. As the anti-rotation mechanism, conventionally known various structures can be adopted. For example, a structure in which a protrusion (a key) provided on the inner-circumferential surface of a fixed member such as a housing is engaged with a concave groove 50 that is formed in the axial direction on the outer-circumferential surface of the nut 3 may be adopted.

[Balls]

The balls 4 are steel balls having a predetermined diameter and are arranged in the load path 7 and the circulation groove 8 so as to be able to roll. The balls 4 arranged in the load path 7 roll while receiving a compressive load, whereas the balls 4 arranged in the circulation groove 8 are pushed by the succeeding balls 4 and roll without receiving a compressive load.

[Stopper]

The stopper 5 is made of metal and has a substantially 6-shape as a whole. The stopper 5 of this example not only has a function of regulating the stroke end of the nut 3, which is a linear motion element, but also has a function of transmitting an axial load between the screw portion 9 and the driving member 6 that are arranged on both sides in the axial direction.

The stopper 5 has a boss portion 17 having an annular shape and a second engaging portion 18 having a projection shape.

The boss portion 17 is externally fitted to the fitting shaft portion of the screw shaft 2 so as not to be able to rotate relative to the fitting shaft portion 10. The boss portion 17 has an engaging hole 19 in the central portion in the radial direction, through which the fitting shaft portion 10 can be inserted in the axial direction. In this example, the engaging hole 19 has female spline teeth 20 on the inner-circumferential surface. The female spline teeth 20 are arranged on the inner-circumferential surface of the engaging hole 19 at a plurality of locations evenly spaced in the circumferential direction. That is, the engaging hole 19 is configured by a spline hole. The boss portion 17 is externally fitted to the fitting shaft portion 10 so as not to be able to rotate relative to the fitting shaft portion 10 by spline-engaging the fitting shaft portion 10 with the engaging hole 19. In this example, although the boss portion 17 is loosely spline-engaged with the fitting shaft portion 10 to allow relative displacement in the axial direction, the boss portion 17 may be spline fitted to the fitting shaft portion 10 in a press-fit state. The thickness in the axial direction of the boss portion 17 is sufficiently smaller than the dimension in the axial direction of the fitting shaft portion 10.

The boss portion 17 has an outer-circumferential surface having a cylindrical surface shape and has an outer diameter that is approximately the same as the outer diameter of the stepped surface 11 provided on the screw shaft 2.

The second engaging portion 18 is provided on a part in the circumferential direction of the outer-circumferential surface of the boss portion 17 and protrudes outward in the radial direction. The outer-circumferential surface of the second engaging portion 18 is formed in a partially cylindrical surface shape and has a circumscribed circle diameter that is approximately the same as the outer diameter of the nut 3.

Figure 5:
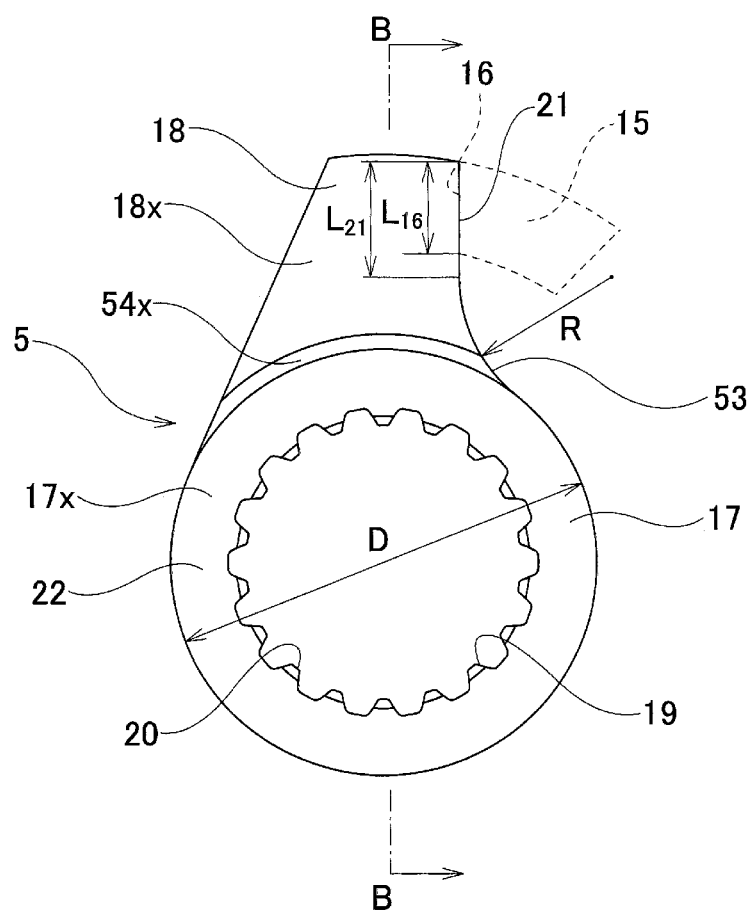
FIG. 5 is a front view of the stopper of the ball screw device of the first example as viewed from one side in the axial direction.

The second engaging portion 18 has a second stopper surface 21, which is a flat surface, on a side surface on the other side in the circumferential direction (right-side surface in FIG. 5). The second stopper surface 21 comes into surface contact with the first stopper surface 16 in a state where the nut 3 has moved relative to the screw shaft 2 toward the one side in the axial direction and reached the stroke end. Due to this, in this example, the second stopper surface 21 is arranged substantially parallel to the center axis of the stopper 5. In this example, the side surface on the other side in the circumferential direction of the second engaging portion 18, that is, the second stopper surface 21, corresponds to the side surface on the side that engages with the first engaging portion 15 in the circumferential direction, and a side surface on the one side in the circumferential direction of the second engaging portion 18 corresponds to the side surface on the side that does not engage with the first engaging portion 15 in the circumferential direction.

The outer-circumferential surface of the second stopper surface 21 and the outer-circumferential surface of the boss portion 17 are smoothly connected through a concave curved surface 53 having an arc-shaped contour when viewed from the axial direction. The radius of curvature R of the concave curved surface 53 is set to the largest possible value within the range that satisfies the following first and second conditions. The first condition is that the dimension $L_{21}$ in the radial direction of the second stopper surface 21 is larger than the dimension $L_{16}$ in the radial direction of the first stopper surface 16 ($L_{21} > L_{16}$). The second condition is that the difference between the dimension $L_{21}$ in the radial direction of the second stopper surface 21 and the dimension $L_{16}$ in the radial direction of the first stopper surface 16 ($L_{21} - L_{16}$) is 1/10 times or more the dimension $L_{16}$ in the radial direction of the first stopper surface 16 ($L_{21} - L_{16} \geq 1/10 \times L_{16}$). In this example, the radius of curvature R of the concave curved surface 53 is set so as to satisfy these first and second conditions. Specifically, the radius of curvature R of the concave curved surface 53 is preferably 1/5 to 1/2 times the diameter D of the boss portion 17, and in the illustrated example, the radius of curvature R of the concave curved surface 53 is about 1/3 times the diameter D of the boss portion 17.

The side surface on the one side in the circumferential direction of the second engaging portion 18 (left-side surface in FIG. 5) is formed to be a flat surface and extends in a tangential direction of the outer-circumferential surface of the boss portion 17. Therefore, the side surface on the one side in the circumferential direction of the second engaging portion 18 is connected to the outer-circumferential surface of the boss portion 17 in the tangential direction of the outer-circumferential surface of the boss portion 17 when viewed from the axial direction. Accordingly, the second engaging portion 18 has a tapered shape in which the width in the circumferential direction becomes smaller from the inside in the radial direction toward the outside in the radial direction, in other words, a substantially trapezoidal end face shape when viewed from the axial direction.

In a case of implementing the present invention, as long as the side surface on the one side in the circumferential direction of the second engaging portion is smoothly connected to the outer-circumferential surface of the boss portion, that is, when a tangent to the side surface on the one side in the circumferential direction of the second engaging portion at the connecting portion with the outer-circumferential surface of the boss portion and a tangent to the outer-circumferential surface of the boss portion at the connecting portion with the side surface on the one side in the circumferential direction of the second engaging portion exist on the same straight line when viewed from the axial direction, the side surface on the one side in the circumferential direction of the second engaging portion does not necessarily have to be a flat surface. For example, the side surface on the one side in the circumferential direction of the second engaging portion may be configured by a convex curved surface having a radius of curvature larger than the radius of curvature of the outer-circumferential surface of the boss portion.

The thickness in the axial direction of the second engaging portion 18 is constant over the radial direction and is smaller than the thickness in the axial direction of the boss portion 17. Due to this, a side surface 18x on the one side in the axial direction of the second engaging portion 18 is arranged so as to be shifted in the axial direction to the other side in the axial direction with respect to a side surface 17x on the one side in the axial direction of the boss portion 17, and a side surface 18y on the other side in the axial direction of the second engaging portion 18 is arranged so as to be shifted in the axial direction to the one side in the axial direction with respect to the side surface 17y on the other side in the axial direction of the boss portion 17. In other words, the side surface 17x on the one side in the axial direction of the boss portion 17 protrudes more in the axial direction than the side surface 18x on the one side in the axial direction of the second engaging portion 18, and the side surface 17y on the other side in the axial direction of the boss portion 17 protrudes more in the axial direction than the side surface 18y on the other side in the axial direction of the second engaging portion 18.

As a result, each of the side surfaces on both sides in the axial direction of the stopper 5 has a stepped shape instead of a flat surface. The side surface 17x on the one side in the axial direction of the boss portion 17 and the side surface 18x on the one side in the axial direction of the second engaging portion 18 are connected through a stepped portion 54x having an arc-shaped cross section. The side surface 17y on the other side in the axial direction of the boss portion 17 and the side surface 18y on the other side in the axial direction of the second engaging portion 18 are connected through a stepped portion 54y having an arc-shaped cross section. In this example, the radius of curvature of each of the stepped portion 54x and the stepped portion 54y is set to a value about 1/25 to 1/2 times the dimension in the axial direction of the stopper 5, preferably about 1/10 to 1/3 times.

In this example, the amount of positional deviation (offset amount, height of stepped portion) t1 of the side surface 18x on the one side in the axial direction of the second engaging portion 18 toward the other side in the axial direction with respect to the side surface 17x on the one side in the axial direction of the boss portion 17 and the amount of positional deviation t2 of the side surface 18y on the other side in the axial direction of the second engaging portion 18 toward the one side in the axial direction with respect to the side surface 17y on the other side in the axial direction of the boss portion 17 are the same (t1=t2). In other words, the side surface on the one side in the axial direction and the side surface on the other side in the axial direction of the stopper 5 are mirror symmetrical. As a result, even if the second engaging portion 18 contacts the first engaging portion 15 and is deformed, the second engaging portion 18 can be prevented from interfering with the nut 3 and the driving member 6, and the mounting state of the stopper 5 can be stabilized.

In this example, the amounts of positional deviation t1, t2 of the side surfaces 18x, 18y in the axial direction of the second engaging portion 18 are set to a small value of about 1/20 to 1/5, preferably about 1/15 to 1/8 times the dimension T in the axial direction of the stopper 5. In the illustrated example, the dimension T in the axial direction of the stopper 5 is set to 5 mm, and each of the amounts of positional deviation t1, t2 of the side surface 18x on the one side in the axial direction of the second engaging portion 18 and the side surface 18y on the other side in the axial direction is set to 0.5 mm.

In this example, of the side surface on the one side in the axial direction of the stopper 5, a side surface 17x on the one side in the axial direction of the boss portion 17 having an annular shape projecting more in the axial direction than the side surface 18x on the one side in the axial direction of the second engaging portion 18 serves as a first contact surface 22 that contacts an annular surface 28 of the driving member 6, which will be described later. Of the side surface on the other side in the axial direction of the stopper 5, the side surface 17y on the other side in the axial direction of the boss portion 17 having an annular shape projecting more in the axial direction than the side surface 18y on the other side in the axial direction of the second engaging portion 18 serves as a second contact surface 23 that contacts the stepped surface 11 of the screw portion 9.

The first contact surface 22 is configured by a flat surface existing on a virtual plane perpendicular to the center axis of the stopper 5 and has a rotationally symmetrical shape in relation to the center axis of the stopper 5. Specifically, the first contact surface 22 has an n-fold symmetry (n is the number of female spline teeth formed on the inner-circumferential surface of the engaging hole 19).

The second contact surface 23 is configured by a flat surface existing on a virtual plane perpendicular to the center axis of the stopper 5 and has a rotationally symmetrical shape in relation to the center axis of the stopper 5. Specifically, the second contact surface 23 has an n-fold symmetry (n is the number of female spline teeth formed on the inner-circumferential surface of the engaging hole 19).

In this example, the first contact surface 22 and the second contact surface 23 each has a circular outer peripheral edge and an uneven inner peripheral edge and has the same shape and size. The stopper 5 of this example as described above has a symmetrical shape in the axial direction (left-right symmetrical in FIG. 6).

The stopper 5 of this example as described above can be manufactured, for example, as follows. First, for example, a metal material having a cylindrical shape is subjected to multiple stage forging process such as a cold forging process to gradually plastically deform the shape of the material into an approximate shape of the stopper 5 so as to manufacture an intermediate material having an approximate shape of the stopper 5. That is, by performing the forging process to the material, the intermediate material provided with an annular boss portion having female spline teeth on the inner-circumferential surface and a protruding second engaging portion is obtained. After that, of the side surfaces on both sides in the axial direction of the intermediate material, each of the side surfaces on both sides in the axial direction of the boss portion which respectively becomes the first contact surface 22 and the second contact surface 23 is subjected to machining such as a cutting process and a griding process. As a result, the flatness of the side surfaces on both sides in the axial direction of the boss portion is improved, and the first contact surface 22 and the second contact surface 23 are formed on the side surfaces on both sides in the axial direction of the boss portion. Then, the stopper 5, which is a finished product, is obtained. The side surfaces on both sides in the axial direction of the second engaging portion can be used as they are after a forging process. However, it is also possible to perform machining such as a cutting process and a griding process to the side surfaces on both sides in the axial direction of the second engaging portion.

When the amount of positional deviation t1 of the side surface 18x on the one side in the axial direction of the second engaging portion 18 toward the other side in the axial direction with respect to the side surface 17x on the one side in the axial direction of the boss portion 17 and the amount of positional deviation t2 of the side surface 18y on the other side in the axial direction of the second engaging portion 18 toward the one side in the axial direction with respect to the side surface 17y on the other side in the axial direction of the boss portion 17 are different, material flow tends to be biased during a forging process. When at least one of the amount of positional deviation t1 and the amount of positional deviation t2 is set to a large value, the amount of elongation (amount of crushing) of the material during a forging process becomes large, and stress in the axial direction concentrates, and cracks are likely to occur at the boundary portion between the second engaging portion 18 and the boss portion 17. As in this example, when the amounts of positional deviation t1, t2 of the side surfaces 18x, 18y in the axial direction of the second engaging portion 18 with respect to the dimension T in the axial direction of the stopper 5 are set small, the occurrence of cracks can be prevented.

However, in a case of implementing the present invention, as long as the occurrence of cracks can be prevented, the amount of positional deviation of the side surface on the one side in the axial direction of the second engaging portion toward the other side in the axial direction with respect to the side surface on the one side in the axial direction of the boss portion and the amount of positional deviation of the side surface on the other side in the axial direction of the second engaging portion toward the one side in the axial direction with respect to the side surface on the other side in the axial direction of the boss portion can be made different.

[Driving Member]

The driving member 6 is a member such as a gear or a pulley, and rotationally drives the screw shaft 2 by transmitting torque input from a driving source such as an electric motor to the screw shaft 2. The driving member 6 is arranged adjacent to the one side in the axial direction of the stopper 5 such that the stopper 5 is held in the axial direction between the driving member 6 and the screw portion 9.

The driving member 6 has a disk portion 24 and a cylindrical portion 25.

The disk portion 24 has a mounting hole 26 that penetrates in the axial direction in the central portion in the radial direction. The mounting hole 26 has female spline teeth 27 on the inner-circumferential surface. The female spline teeth 27 are arranged at a plurality of locations evenly spaced in the circumferential direction of the inner-circumferential surface of the mounting hole 26. That is, the mounting hole 26 is configured by a spline hole. The disk portion 24 is externally fitted to the fitting shaft portion 10 so as not to be able to rotate relative to the fitting shaft portion 10 by spline-engaging a portion of the fitting shaft portion 10, that is deviated on the one side in the axial direction from the portion where the stopper 5 is externally fitted, with the mounting hole 26. In this example, the fitting shaft portion is spline-engaged with the mounting hole 26 of the disk portion 24 by press fitting. However, it is also possible to prevent the driving member from displacing in the axial direction with respect to the screw shaft by loosely spline-engaging the fitting shaft portion with the mounting hole of the driving member and screwing a stop nut or locking a stop ring to a portion of the fitting shaft portion protruding more toward the one side in the axial direction than the disk portion of the driving member. The disk portion 24 has an annular surface 28 in a portion inward in the radial direction of the side surface on the other side in the axial direction. The annular surface 28 is configured by a flat surface existing on a virtual plane perpendicular to the center axis of the driving member 6.

The cylindrical portion 25 extends in the axial direction from a portion on the outside in the radial direction of the side surface on the other side in the axial direction of the disk portion 24. The cylindrical portion 25 has an inner diameter slightly larger than the outer diameter of the nut 3. The cylindrical portion 25 covers the stopper 5 and the periphery of an end portion on the one side in the axial direction of the screw portion 9.

It is also possible to form a gear portion and stretch a belt around the outer-circumferential surface of the disk portion 24 or the cylindrical portion 25.

The driving member 6 is externally fitted and fixed to the fitting shaft portion 10 at a position thereof adjacent to the one side in the axial direction of the stopper 5 such that the stopper 5 is held in the axial direction between the driving member 6 and the screw portion 9. As a result, the annular surface 28 of the disk portion 24 of the driving member 6 is brought into surface contact over the entire circumference with the first contact surface 22 configured by the side surface 17x on the one side in the axial direction of the boss portion 17 of the side surface on the one side in the axial direction of the stopper 5. Further, the stepped surface 11 of the screw portion 9 is brought into surface contact over the entire circumference with the second contact surface 23 configured by the side surface 17y on the other side in the axial direction of the boss portion 17 of the side surface on the other side in the axial direction of the stopper 5. In this state, a gap is formed between the side surface on the other side in the axial direction of the disk portion 24 and the side surface 18x on the one side in the axial direction of the second engaging portion 18 of the stopper 5. Furthermore, the side surface 18y on the other side in the axial direction of the second engaging portion 18 is arranged more on the one side in the axial direction than the stepped surface 11.

[Explanation of the Operation of the Ball Screw Device]

In the ball screw device 1 of this example, the nut 3 is linearly moved by rotationally driving the screw shaft 2 through the driving member 6 by a driving source (not illustrated).

When the nut 3 moves to the one side in the axial direction relative to the screw shaft 2 and reaches the stroke end by rotationally driving the screw shaft 2 in a predetermined direction, the first stopper surface 16 of the first engaging portion 15 provided on the nut 3 and the second stopper surface 21 of the second engaging portion 18 provided on the stopper 5 engage in the circumferential direction. In this example, the first stopper surface 16 and the second stopper surface 21 are brought into surface contact. As a result, the screw shaft 2 is prevented from rotating in the predetermined direction. Thus, in the ball screw device 1 of this example, the stopper 5 can regulate the stroke end related to the relative movement of the nut 3 to the one side in the axial direction with respect to the screw shaft 2. Here, the stroke end related to the relative movement of the nut 3 to the other side in the axial direction with respect to the screw shaft 2 can be regulated by using various conventionally known stroke limiting mechanisms.

The ball screw device 1 of this example transmits an axial load between the screw portion 9 and the driving member 6 through the stopper 5. For example, when the nut 3 is relatively moved to the other side in the axial direction with respect to the screw shaft 2 by rotationally driving the screw shaft 2 in a direction opposite to the predetermined direction, an axial load (reaction force) directed to the one side in the axial direction acts on the screw shaft 2 through the ball 4 arranged in the load path 7. In this example, after the axial load directed to the one side in the axial direction acting on the screw shaft 2 is transmitted to the second contact surface 23 of the stopper 5 from the stepped surface 11 of the screw portion 9, it can be transmitted from the first contact surface 22 of the stopper 5 to the annular surface 28 of the disk portion 24 of the driving member 6 and supported by the driving member 6. Conversely, an axial load directed to the other side in the axial direction acting on the driving member 6 is also transmitted from the annular surface 28 of the disk portion 24 to the first contact surface 22 of the stopper 5, and then it can be transmitted from the second contact surface 23 of the stopper 5 to the stepped surface 11 of the screw portion 9.

With the ball screw device 1 of this example as described above, an axial load can be transmitted between the screw portion 9 and the driving member 6 without shortening the life of the ball screw device 1.

Figure 6:
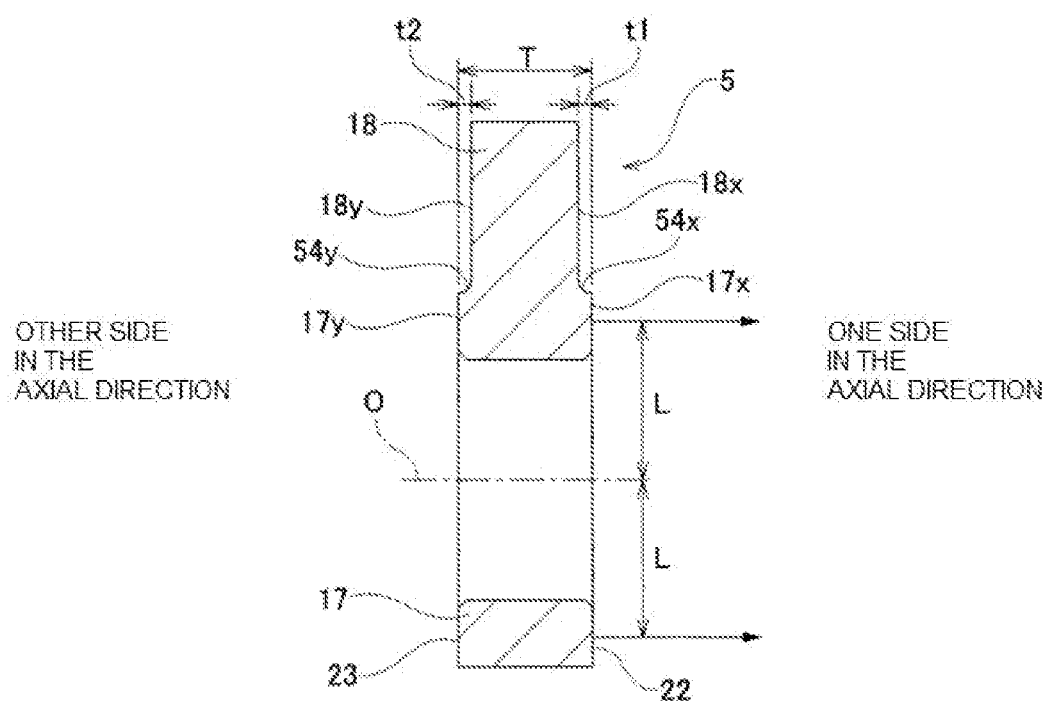
FIG. 6 is a cross-sectional view of section B-B in FIG. 5.
Figure 7:
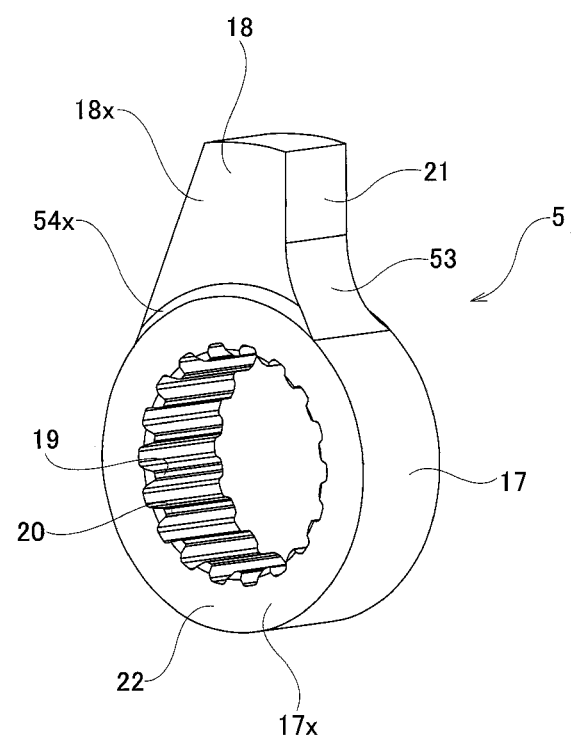
FIG. 7 is a perspective view of the stopper of the first example.

In this example, each of the first contact surface 22 and the second contact surface 23 is configured by a flat surface existing on a virtual plane perpendicular to the center axis of the stopper 5 and has a rotationally symmetrical shape in relation to the center axis of the stopper 5. Therefore, the magnitude of the load acting on the second contact surface 23 from the center axis of the stopper 5 and the distance L from the center axis of the stopper 5 to the load acting point (load input point) are the same on both side portions located on opposite sides of the center axis of the stopper 5, that is, on portions where the phases differ by 180 degrees. Further, as illustrated in FIG. 6, the magnitude of the load acting on the first contact surface 22 from the center axis of the stopper 5 and the distance L from the center axis of the stopper 5 to the load acting point (load input point) are the same on both side portions located on opposite sides of the center axis O of the stopper 5, that is, on portions where the phases differ by 180 degrees. Accordingly, with the ball screw device 1 of this example, when the axial load distribution is converted into a concentrated load, the line of action of the concentrated load can be positioned on the center axis O of the stopper 5.

Therefore, with the ball screw device 1 of this example, it is possible to transmit the axial load between the screw portion 9 and the driving member 6 through the stopper 5 without applying a moment to the stopper 5. Accordingly, it is possible to prevent the screw shaft 2 to which the stopper 5 is externally fitted from being tilted, and to suppress uneven application of the load to the balls 4 rolling in the load path 7. As a result, an axial load can be transmitted between the screw portion 9 and the driving member 6 without shortening the life of the ball screw device 1.

With the ball screw device 1 of this example, when the first engaging portion 15 provided on the nut 3 and the second engaging portion 18 provided on the stopper 5 engage in the circumferential direction, that is, collide with each other, it is possible to effectively prevent the occurrence of stress concentration on the stopper 5. That is, in the stopper 5 of this example, the second stopper surface 21 of the second engaging portion 18 and the outer-circumferential surface of the boss portion 17 are smoothly connected through the concave curved surface 53 having an arc-shaped contour when viewed from the axial direction. Further, of the both side surfaces in the circumferential direction of the second engaging portion 18, the side surface on the one side in the circumferential direction that does not engage in the circumferential direction with the first engaging portion 15 is connected to the outer-circumferential surface of the boss portion 17 in the tangential direction of the outer-circumferential surface of the boss portion 17 when viewed from the axial direction. Therefore, it is possible to prevent the occurrence of stress concentration on the connecting portions between the base-end-side portions on both sides in the circumferential direction of the second engaging portion 18 and the outer-circumferential surface of the boss portion 17. Further, in the stopper 5 of this example, the side surface 17x on the one side in the axial direction of the boss portion 17 is connected to the side surface 18x on the one side in the axial direction of the second engaging portion 18 through the stepped portion 54x having an arc-shaped cross section, and the side surface 17y on the other side in the axial direction of the boss portion 17 is connected to the side surface 18y on the other side in the axial direction of the second engaging portion 18 through the stepped portion 54y having an arc-shaped cross section. Furthermore, the stopper 5 has a symmetrical shape in the axial direction. As a result, it is possible to prevent the occurrence of stress concentration on the connecting portions between the base-end-side portions both sides in the axial direction of the second engaging portion 18 and the boss portion 17.

In this example, as described above, since it is possible to effectively prevent the occurrence of stress concentration on the stopper 5 when the first engaging portion 15 provided on the nut 3 and the second engaging portion 18 provided on the stopper 5 engage in the circumferential direction, it is possible to prevent local deformation of the stopper 5. Therefore, even when an axial load is transmitted from the screw portion 9 to the driving member 6 through the stopper based on the inertia force of the balls 4 and the inertia torque of the electric motor that rotationally drives the driving member 6, the distance (moment length) from the center axis of the stopper 5 to the load acting point (load input point) of the axial load is not required to be changed. Therefore, a moment is not required to be applied to the stopper 5. Accordingly, also from such an aspect, it is possible to suppress the shortening of the life of the ball screw device 1.

The stopper 5 of this example is manufactured by first manufacturing an intermediate material having an approximate shape of the stopper 5 by performing a forging process to a metal material, and then performing machining such as a cutting process and a griding process to each of the side surfaces on both sides in the axial direction of the boss portion, which will be the first contact surface 22 and the second contact surface 23. Accordingly, the manufacturing cost of the stopper 5 can be suppressed, and the cost of the ball screw device 1 can be reduced.

Second Example

Figure 8:
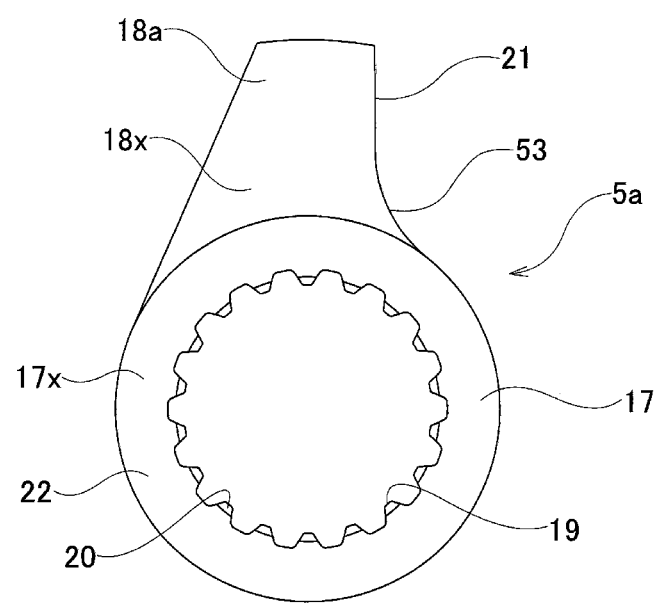
FIG. 8 is a view corresponding to FIG. 5, and illustrates a stopper of a second example of an embodiment of the present invention.
Figure 9:
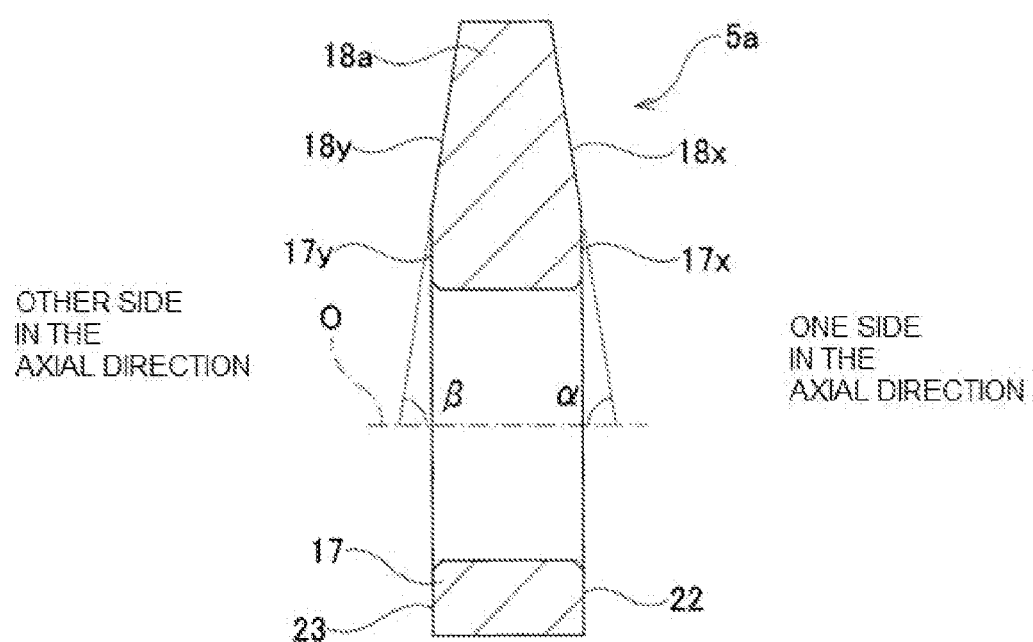
FIG. 9 is a view corresponding to FIG. 6, and illustrates the stopper of the second example.
Figure 10:
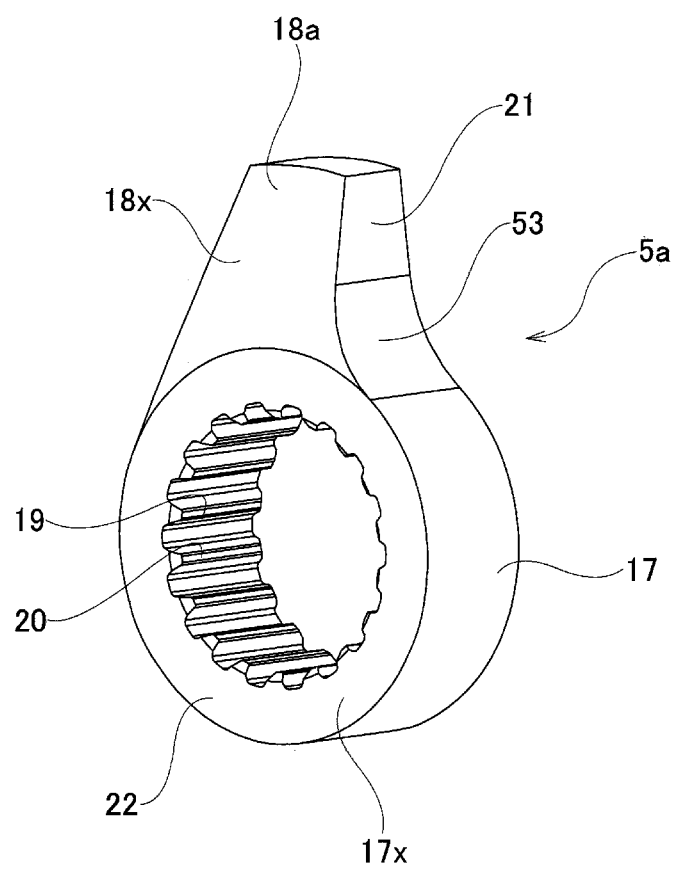
FIG. 10 is a view corresponding to FIG. 7, and illustrates the stopper of the second example.

FIGS. 8 to 10 show a second example of an embodiment of the present invention.

In this example, only the construction of the second engaging portion 18a of the stopper 5a is made different from the construction of the first example.

Specifically, the thickness in the axial direction of the second engaging portion 18a becomes smaller toward outside in the radial direction. Due to this, a side surface 18x on the one side in the axial direction of the second engaging portion 18a is inclined toward the other side in the axial direction as going outward in the radial direction, and a side surface 18y on the other side in the axial direction of the second engaging portion 18a is inclined toward the one side in the axial direction as going outward in the radial direction.

As illustrated in FIG. 9, in this example, the inclination angle α of the side surface 18x on the one side in the axial direction of the second engaging portion 18a with respect to the center axis O of the stopper 5a and the inclination angle β of the side surface 18y on the other side in the axial direction of the second engaging portion 18a with respect to the center axis O of the stopper 5a are the same (α=β). However, in a case of implementing the present invention, the inclination angle of the side surface on the one side in the axial direction of the second engaging portion with respect to the center axis of the stopper and the inclination angle of the side surface on the other side in the axial direction of the second engaging portion with respect to the center axis of the stopper can be made different from each other. In any case, as a result, in a state where the nut 3 moves to the one side in the axial direction with respect to the screw shaft 2 and reaches the stroke end by rotationally driving the screw shaft 2 in a predetermined direction, a gap is formed between the side surface 18x on the one side in the axial direction of the second engaging portion 18a and the side surface on the other side in the axial direction of the disk portion 24 and the side surface 18y on the other side in the axial direction of the second engaging portion 18a is arranged more on the one side in the axial direction than the stepped surface 11.

In this example, each of the side surfaces on both sides in the axial direction of the stopper 5a has a bent shape instead of a stepped shape. That is, the side surface 17x on the one side in the axial direction of the boss portion 17 which configures the first contact surface 22 and the side surface 18x on the one side in the axial direction of the second engaging portion 18a are directly connected without a stepped portion. Further, the side surface 17y on the other side in the axial direction of the boss portion 17 which configures the second contact surface 23 and the side surface 18y on the other side in the axial direction of the second engaging portion 18a are directly connected without a stepped portion. That is, in this example, the side surface 18x on the one side in the axial direction of the second engaging portion 18a is directly connected to the side surface 17x on the one side in the axial direction of the boss portion 17 without shifting their positions in the axial direction, and the side surface 18y on the other side in the axial direction of the second engaging portion 18a is directly connected to the side surface 17y on the other side in the axial direction of the boss portion 17 without shifting their positions in the axial direction. Furthermore, also in this example, the stopper 5a has a symmetrical shape in the axial direction (left-right symmetrical in FIG. 9).

In this example, since each of the side surfaces on both sides in the axial direction of the stopper 5a has a bent shape instead of a stepped shape, the press load when manufacturing the stopper 5a by a forging process can be suppressed to be low, and the stress applied to the forging die can be suppressed to be low. Therefore, the manufacturing cost of the stopper 5a can be suppressed. Other configurations and operational effects are the same as in the first example.

Third Example

Figure 11:
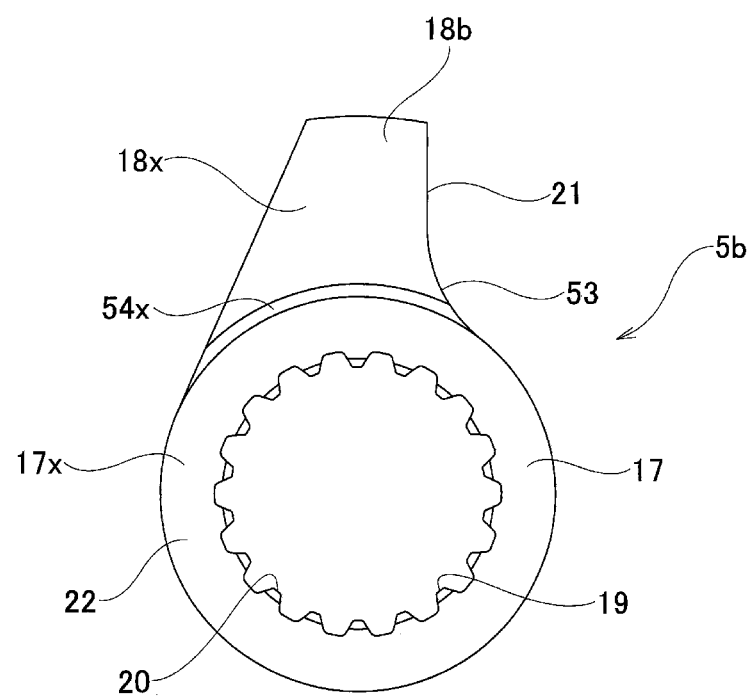
FIG. 11 is a view corresponding to FIG. 5, and illustrates a stopper of a third example of an embodiment of the present invention.
Figure 12:
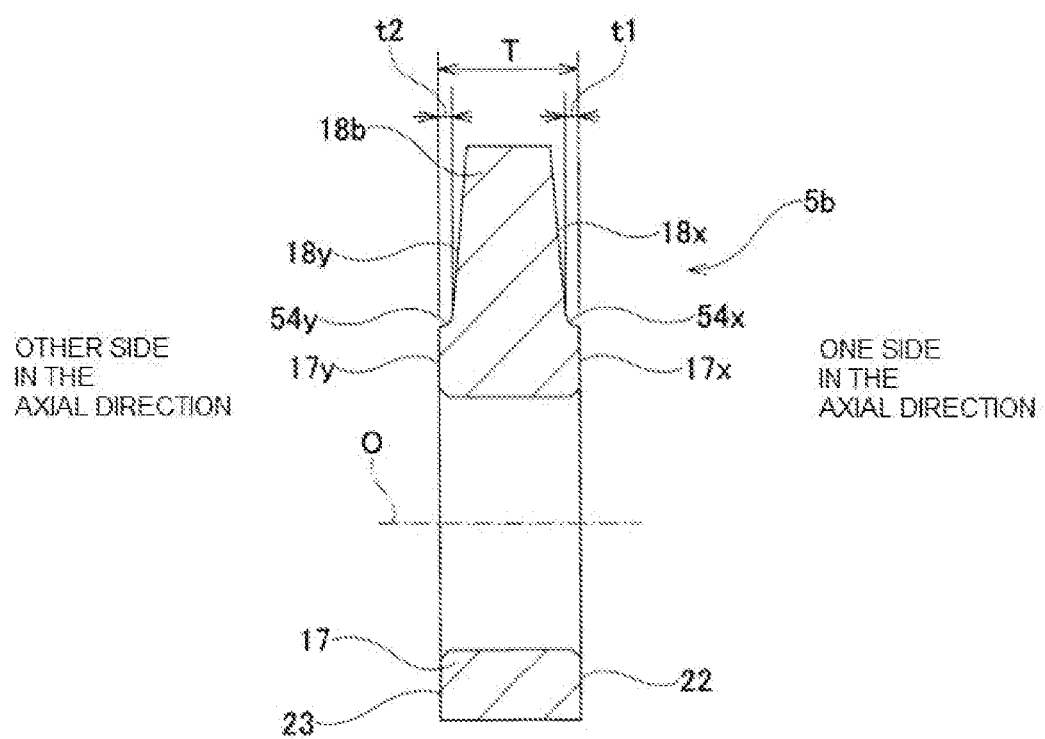
FIG. 12 is a view corresponding to FIG. 6, and illustrates the stopper of the third example.
Figure 13:
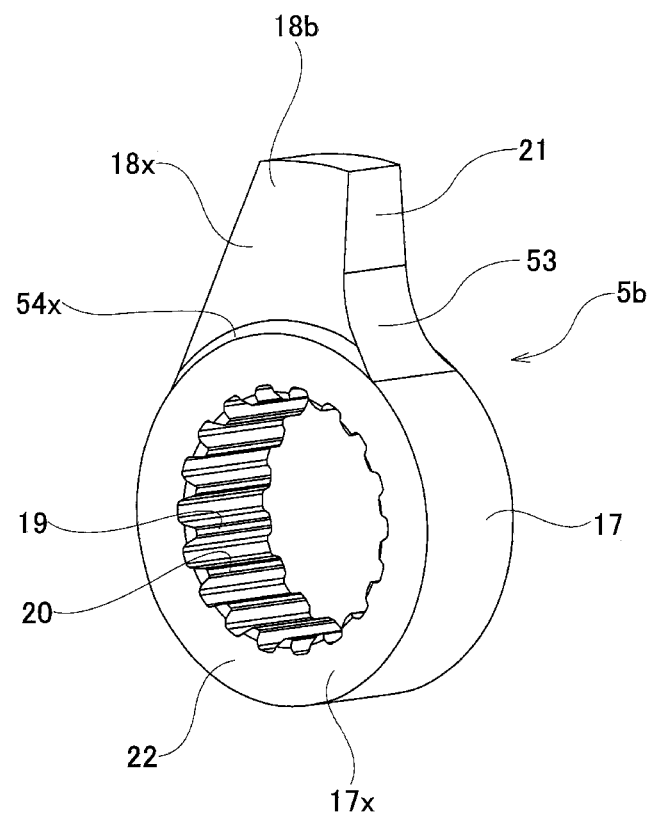
FIG. 13 is a view corresponding to FIG. 7, and illustrates the stopper of the third example.

FIGS. 11 to 13 show a third example of an embodiment of the present invention.

In this example, only the construction of the second engaging portion 18b of the stopper 5b is made different from the construction of the first example and the second example.

Specifically, the thickness in the axial direction of the second engaging portion 18b becomes smaller toward outside in the radial direction, as in the construction of the second example, and each of the side surfaces 18x, 18y on both sides in the axial direction of the second engaging portion 18b is arranged so as to be shifted in the axial direction with respect to the side surfaces 17x, 17y on both sides in the axial direction of the boss portion 17. Due to this, the side surface 17x on the one side in the axial direction of the boss portion 17 which configures the first contact surface 22 and the side surface 18x on the one side in the axial direction of the second engaging portion 18b are not directly connected, but are connected through a stepped portion 54x having an arc-shaped cross section. Further, the side surface 17y on the other side in the axial direction of the boss portion 17 which configures the second contact surface 23 and the side surface 18y on the other side in the axial direction of the second engaging portion 18b are not directly connected, but are connected through a stepped portion 54y having an arc-shaped cross section. Also in this example, the amount of positional deviation (offset amount, height of stepped portion) t1 of the side surface 18x on the one side in the axial direction of the second engaging portion 18b toward the other side in the axial direction with respect to the side surface 17x on the one side in the axial direction of the boss portion 17 and the amount of positional deviation t2 of the side surface 18y on the other side in the axial direction of the second engaging portion 18b toward the one side in the axial direction with respect to the side surface 17y on the other side in the axial direction of the boss portion 17 are the same (t1=t2). Further, the stopper 5b has a symmetrical shape in the axial direction (left-right symmetrical in FIG. 12).

In this example, the respective contour of the first contact surface 22 and the second contact surface 23 provided on the side surfaces on both sides in the axial direction of the boss portion 17 can be clarified. In other words, the boundaries between the outer peripheral edge portions of the first contact surface 22 and the second contact surface 23 and the side surfaces 18x, 18y on both sides in the axial direction of the second engaging portion 18b can be clarified. As a result, compared to the construction of the second example, it is possible to effectively prevent the side surfaces 18x, 18y on both sides in the axial direction of the second engaging portion 18b from contacting the annular surface 28 of the driving member 6 (see FIG. 3) and the stepped surface 11 of the screw portion 9 (see FIG. 3). Other configurations and operational effects are the same as in the first and second examples.

Fourth Example

Figure 14A:
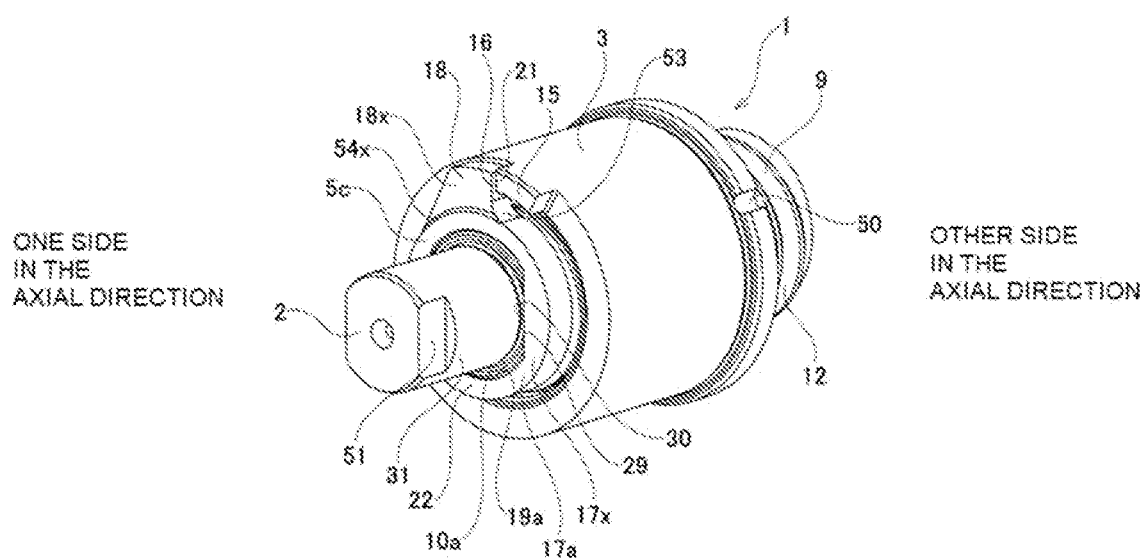
FIG. 14(A) is a view corresponding to FIG. 4, and illustrates a ball screw device of a fourth example of an embodiment of the present invention.
Figure 14B:
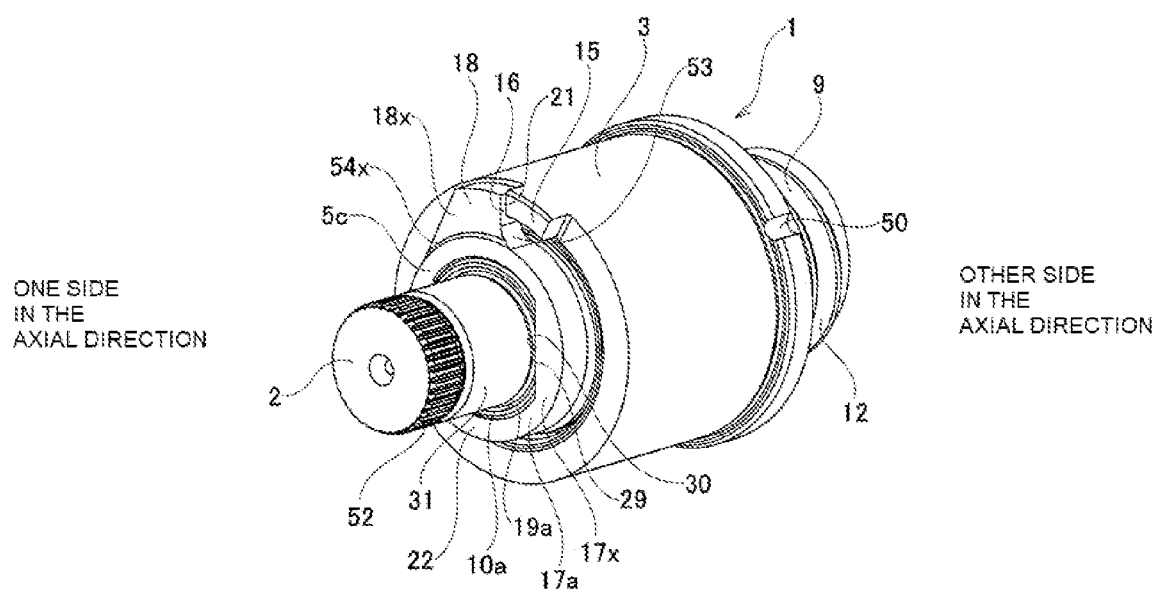
FIG. 14(B) is a view corresponding to FIG. 4, and illustrates a ball screw device of a modification of the fourth example.
Figure 15:
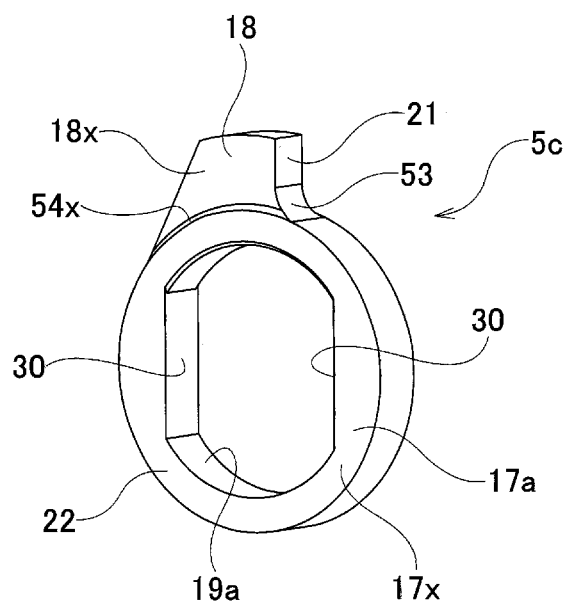
FIG. 15 is a view corresponding to FIG. 7, and illustrates a stopper of the ball screw device of the fourth example.

FIGS. 14(A), 14(B), and 15 show a fourth example of an embodiment of the present invention.

In this example, the fixing structure of the boss portion 17a of the stopper 5c to the fitting shaft portion 10a of the screw shaft 2 is made different from the construction of the first example.

Specifically, the fitting shaft portion 10a has an elliptical cross section (stadium shape) and has a width across flat shape having a pair of flat outer surfaces 29 parallel to each other on the outer-circumferential surface. Further, the engaging hole 19a of the boss portion 17a is an oblong hole (stadium shaped hole), and is configured in a width across flat shape having a pair of flat inner surfaces 30 parallel to each other on the inner-circumferential surface.

In this example, in a state where the fitting shaft portion 10a of the screw shaft 2 is loosely inserted inside the engaging hole 19a of the stopper 5c, each of the pair of flat inner surfaces 30 provided on the inner-circumferential surface of the engaging hole 19a and each of the pair of flat outer surfaces 29 provided on the outer-circumferential surface of the fitting shaft portion 10a is engaged with each other, that is, they come into surface contact with each other. As a result, the stopper 5c is non-circularly fitted to the fitting shaft portion 10a so as not to be able to relatively rotate. The boss portion 17a of the stopper 5c may be non-circularly fitted to the fitting shaft portion 10a by press fitting.

The screw shaft 2 further includes a second fitting shaft portion 31 for externally fitting a holding member (not illustrated) such as a driving member 6 or a rolling bearing on the one side in the axial direction of the fitting shaft portion 10a so as not to be able to rotate relative to each other. For example, as illustrated in FIG. 14(A), the second fitting shaft portion 31 can be provided at an end portion on the one side in the axial direction and configured to have an elliptical cross section and a width across flats having a pair of flat outer surfaces 51 parallel to each other on the outer-circumferential surface. As a modification of the fourth example, as illustrated in FIG. 14(B), the second fitting shaft portion 31 can also be provided at the end portion on the one side in the axial direction and configured to have a spline shaft portion having male spline teeth 52 on the outer-circumferential surface. In either case, the stopper 5c is prevented from slipping out from the fitting shaft portion 10a to the one side in the axial direction by the holding member externally fitted to the second fitting shaft portion 31 so as not to be able to rotate relative to each other.

In this example, the outer surface shape of the fitting shaft portion 10a and the inner surface shape of the engaging hole 19a can be simplified compared to the case of forming spline teeth. Therefore, the processing cost can be reduced, and the manufacturing cost can be reduced. Further, since it is easier to secure the fitting length as compared with the construction of the first example, the thickness in the axial direction of the stopper 5c can be reduced. Accordingly, the dimension in the axial direction of the ball screw device 1 (see FIG. 2) can be reduced. Other configurations and operational effects are the same as in the first example.

In the fourth example as described above, a construction has been described in which a second fitting shaft portion 31 having a cross-sectional shape different from the fitting shaft portion 10a is provided on the one side in the axial direction of the fitting shaft portion 10a and a holding member is externally fitted to the second fitting shaft portion 31 so as not to be able to rotate relative to each other. However, as another modification of the fourth example, it is also possible to adopt a construction in which the length in the axial direction of the fitting shaft portion 10a having a width across flat shape provided with a pair of flat outer surfaces 29 on the outer-circumferential surface is extended, and a holding member provided with a mounting hole having a width across flat shape provided with a pair of flat inner surfaces on the inner-circumferential surface is externally fitted to a portion of the fitting shaft portion 10a protruding from the stopper 5c to the one side in the axial direction so as not to be able to rotate relative to each other.

Fifth Example

Figure 16A:
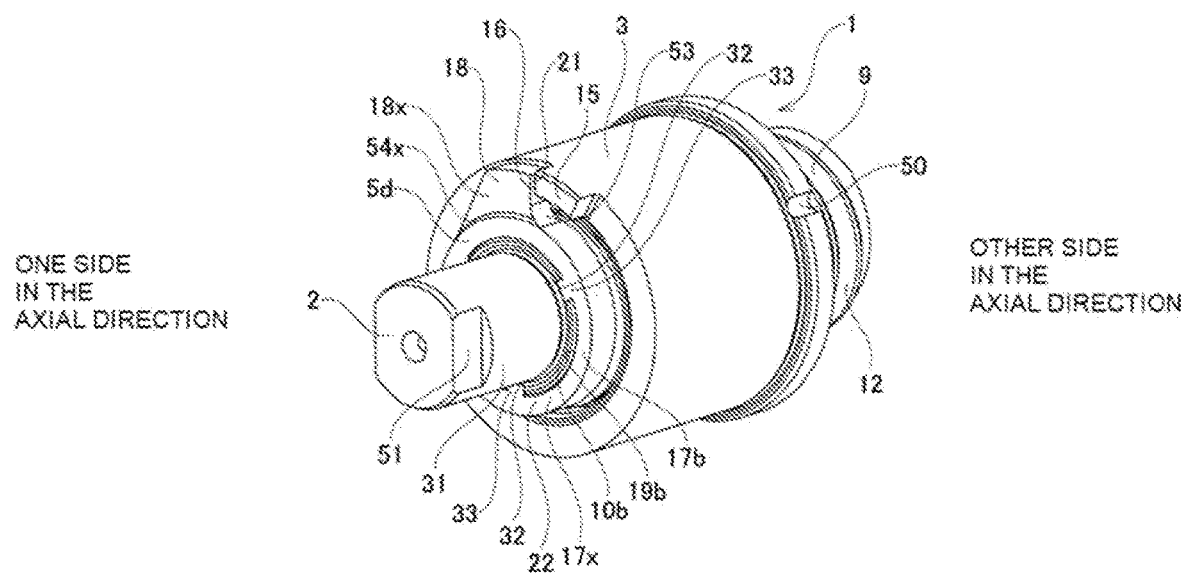
FIG. 16(A) is a view corresponding to FIG. 4, and illustrates a ball screw device of a fifth example of an embodiment of the present invention.
Figure 16B:
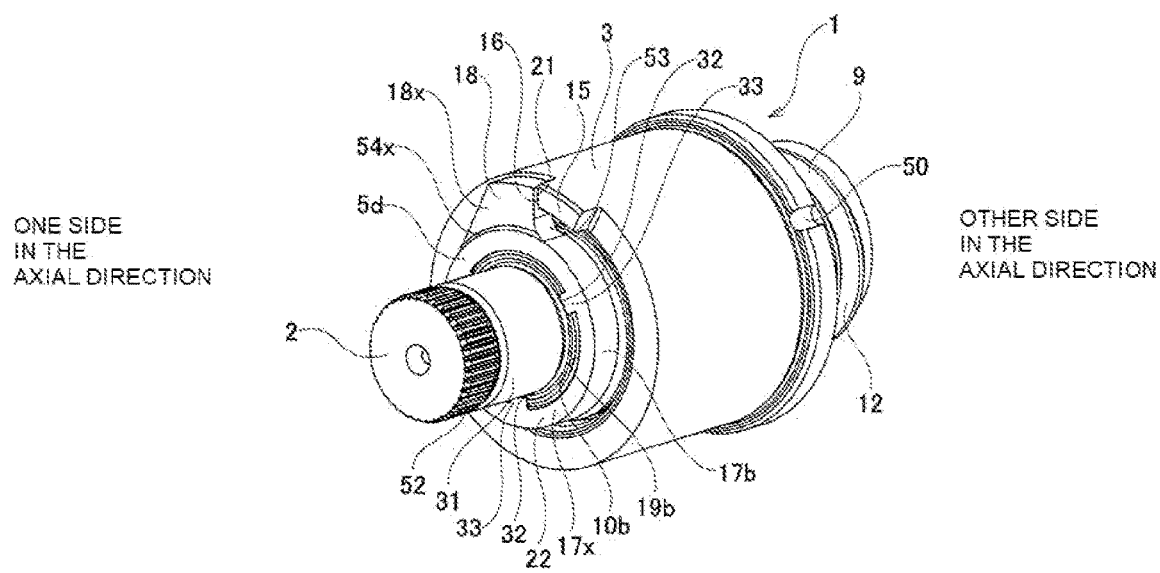
FIG. 16(B) is a view corresponding to FIG. 4, and illustrates a ball screw device of a modification of the fifth example.
Figure 17:
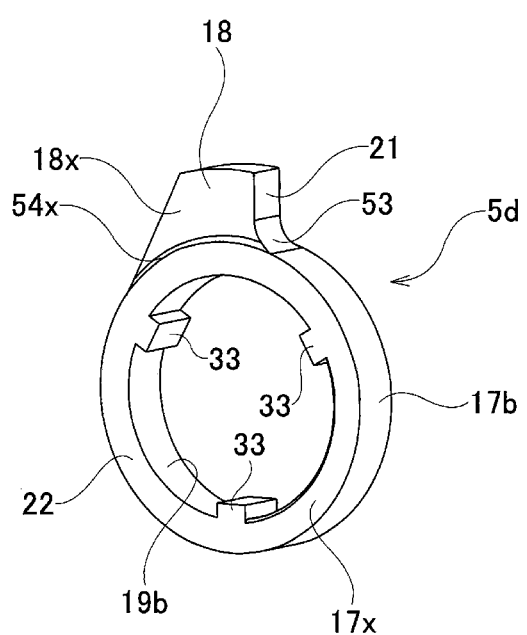
FIG. 17 is a view corresponding to FIG. 7, and illustrates a stopper of the ball screw device of the fifth example.

FIGS. 16(A), FIGS. 16(B), and 17 show a fifth example of an embodiment of the present invention.

In this example, the fixing structure of the boss portion 17b of the stopper 5d to the fitting shaft portion 10b of the screw shaft 2 is made different from the structures of the first and fourth examples.

Specifically, the fitting shaft portion 10b is configured by forming engaging concave grooves 32 each extending in the axial direction at a plurality of locations in the circumferential direction (three locations in the illustrated example) on the outer-circumferential surface having a cylindrical surface shape. The engaging concave grooves 32 are evenly spaced in the circumferential direction.

Further, the engaging hole 19b of the boss portion 17b is configured by forming engaging claw portions 33 each protruding inward in the radial direction at a plurality of locations in the circumferential direction (three locations in the illustrated example) on the inner-circumferential surface having a cylindrical surface shape. The engaging claw portions 33 are evenly spaced in the circumferential direction.

In this example, the engaging claw portions 33 are engaged with the engaging concave grooves 32 in a state where the fitting shaft portion 10b of the screw shaft 2 is loosely inserted inside the engaging hole 19b of the boss portion 17b. As a result, the stopper 5d is non-circularly fitted to the fitting shaft portion 10b so as not to be able to rotate relative to each other. The boss portion 17b of the stopper 5d may be non-circularly fitted to the fitting shaft portion 10b by press fitting.

Also in this example, the screw shaft 2 further includes a second fitting shaft portion 31 on the one side in the axial direction of the fitting shaft portion 10b for externally fitting a holding member (not illustrated) such as a driving member 6 or a rolling bearing so as not to be able to rotate relative to each other. As in the fourth example, it is possible to adopt a construction illustrated in, for example, FIG. 16(A) or FIG. 16(B) as the second fitting shaft portion 31.

In this example, since torque can be transmitted between the stopper 5d and the fitting shaft portion 10b using a plurality of engaging portions between the engaging claw portions 33 and the engaging concave grooves 32, allowable torque can be increased compared to the construction of the fourth example. Further, since the outer surface shape of the fitting shaft portion 10b and the inner surface shape of the engaging hole 19b can be simplified compared to the case of forming spline teeth, the processing cost can be reduced and the manufacturing cost can be reduced. Other configurations and operational effects are the same as in the first and fourth examples.

In the fifth example, a construction has been described in which the second fitting shaft portion 31 having a cross-sectional shape different from that of the fitting shaft portion 10b is provided on the one side in the axial direction of the fitting shaft portion 10b and a holding member is externally fitted to the second fitting shaft portion 31 so as not to be able to rotate relative to each other. However, as another modification of the fifth example, it is also possible to adopt a construction in which the length in the axial direction of the fitting shaft portion 10b having engaging concave grooves 32 on the outer-circumferential surface is extended, and a holding member provided with a mounting hole having engaging claw portions on the inner-circumferential surface is externally fitted to a portion of the fitting shaft portion 10b protruding toward the one side in the axial direction from the stopper 5d so as not to be able to rotate relative to each other.

Sixth Example

Figure 18:
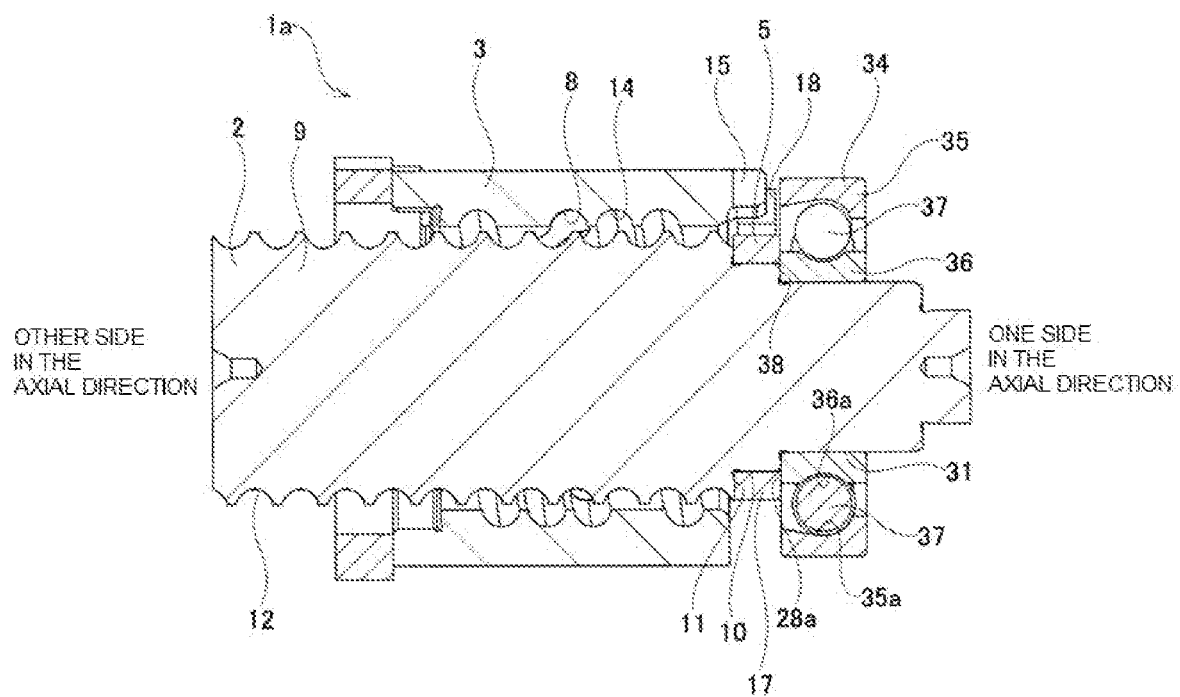
FIG. 18 is a view corresponding to FIG. 2, and illustrates a stopper of a ball screw device of a sixth example of an embodiment of the present invention.
Figure 19:
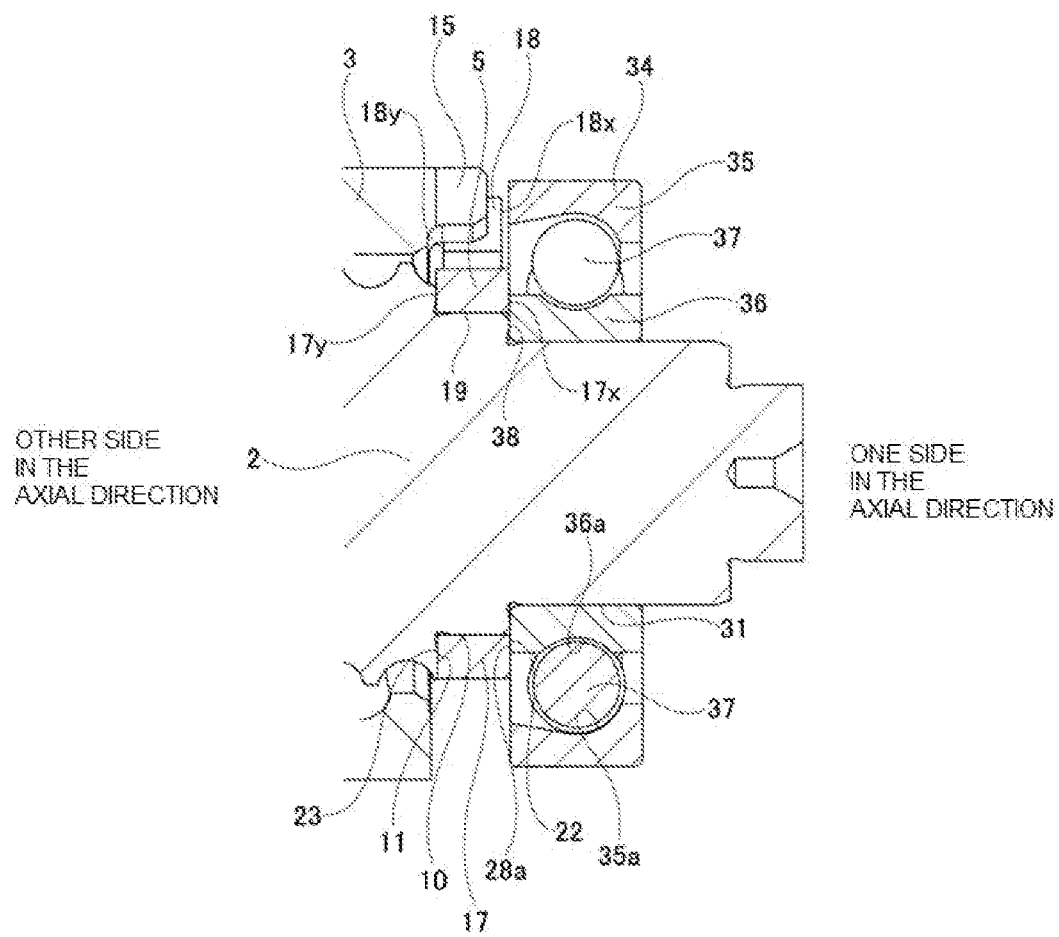
FIG. 19 is a view corresponding to FIG. 3, and illustrates the stopper of the sixth example.

FIGS. 18 and 19 show a sixth example of an embodiment of the present invention.

The ball screw device 1a of this example uses a rolling bearing 34 as a holding member that is arranged on the one side in the axial direction of the stopper 5 such that the stopper 5 is held between the rolling bearing 34 and the screw portion 9 in the axial direction.

The rolling bearing 34 has an annular outer ring 35 having an outer ring raceway 35a on the inner-circumferential surface, an annular inner ring 36 having an inner ring raceway 36a on the outer-circumferential surface, and rolling elements 37 arranged between the outer ring raceway 35a and the inner ring raceway 36a so as to be able to roll freely. The inner ring 36 has an annular surface 28a, which is configured by a flat surface existing on a virtual plane perpendicular to the center axis of the inner ring 36, on a side surface on the other side in the axial direction.

In this example, the inner ring 36 of the rolling bearing 34 is externally fitted by press fitting to the second fitting shaft portion 31 which has an outer-circumferential surface having a cylindrical surface shape and provided on the one side in the axial direction of the fitting shaft portion 10. As a result, the inner ring 36 is externally fitted to the second fitting shaft portion 31 so as not to be able to rotate relative to each other. Further, the radially inner portion of the annular surface 28a of the inner ring 36 is abutted against a second stepped surface 38, which is arranged between the fitting shaft portion 10 and the second fitting shaft portion 31 of the screw shaft 2 and faces the one side in the axial direction.

In this example, the stopper 5 is held in the axial direction between the inner ring 36 and the screw portion 9 by externally fitting and fixing the inner ring 36 of the rolling bearing 34 to the second fitting shaft portion 31. As a result, the radially outer portion in the radial direction of the annular surface 28a of the inner ring 36 is brought into surface contact over the entire circumference with the first contact surface 22 configured by a side surface 17x on the one side in the axial direction of the boss portion 17 of a side surface on the one side in the axial direction of the stopper 5. Further, the stepped surface 11 of the screw portion 9 is brought into surface contact over the entire circumference with the second contact surface 23 configured by a side surface 17y on the other side in the axial direction of the boss portion 17 of a side surface on the other side in the axial direction of the stopper 5. In this state, a gap is formed between the side surface on the other side in the axial direction of the outer ring 35 and the side surface 18x on the one side in the axial direction of the second engaging portion 18 of the stopper 5. Further, a side surface 18y on the other side in the axial direction of the second engaging portion 18 is arranged so as to retreat from the stepped surface 11 in the axial direction.

Also in this example, an axial load can be transmitted between the screw portion 9 and the rolling bearing 34 without shortening the life of the ball screw device 1a. Other configurations and operational effects are the same as in the first example.

Seventh Example

Figure 20:
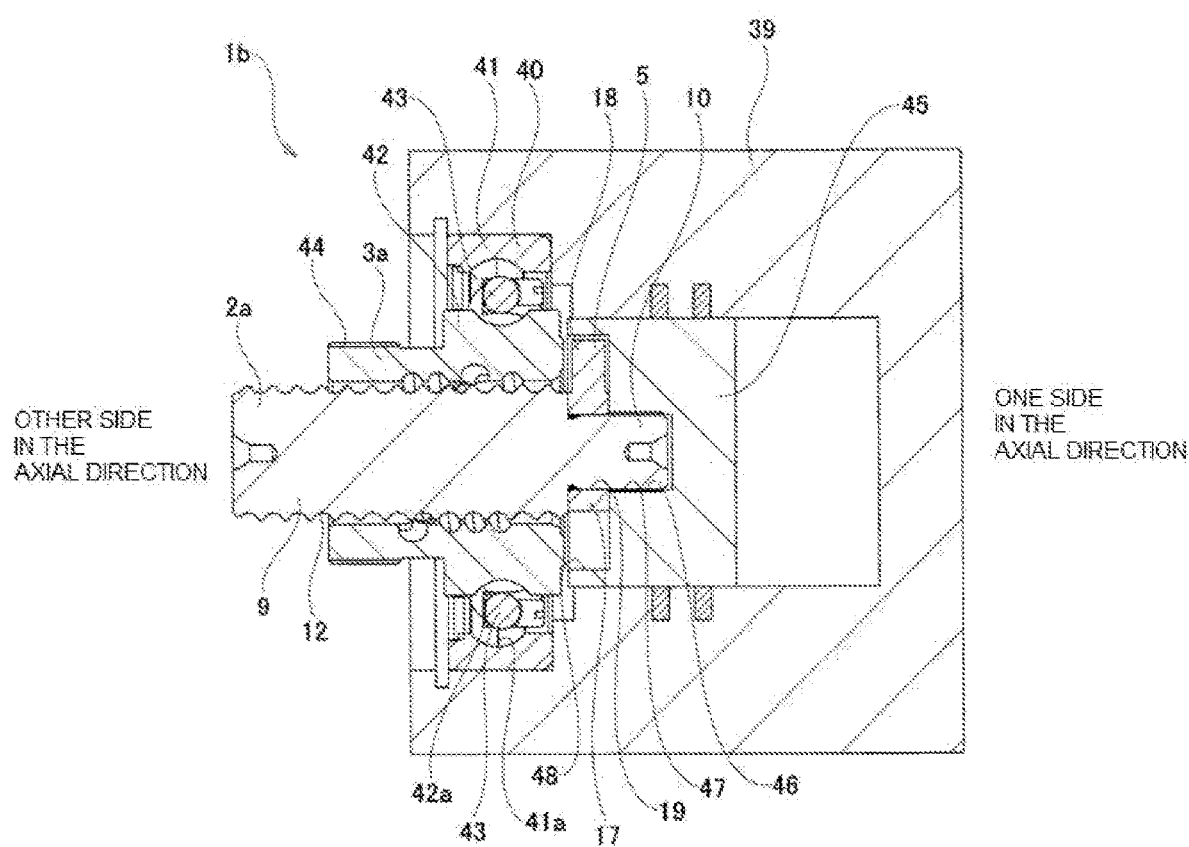
FIG. 20 is a view corresponding to FIG. 2, and illustrates a ball screw device of a seventh example of an embodiment of the present invention.
Figure 21:
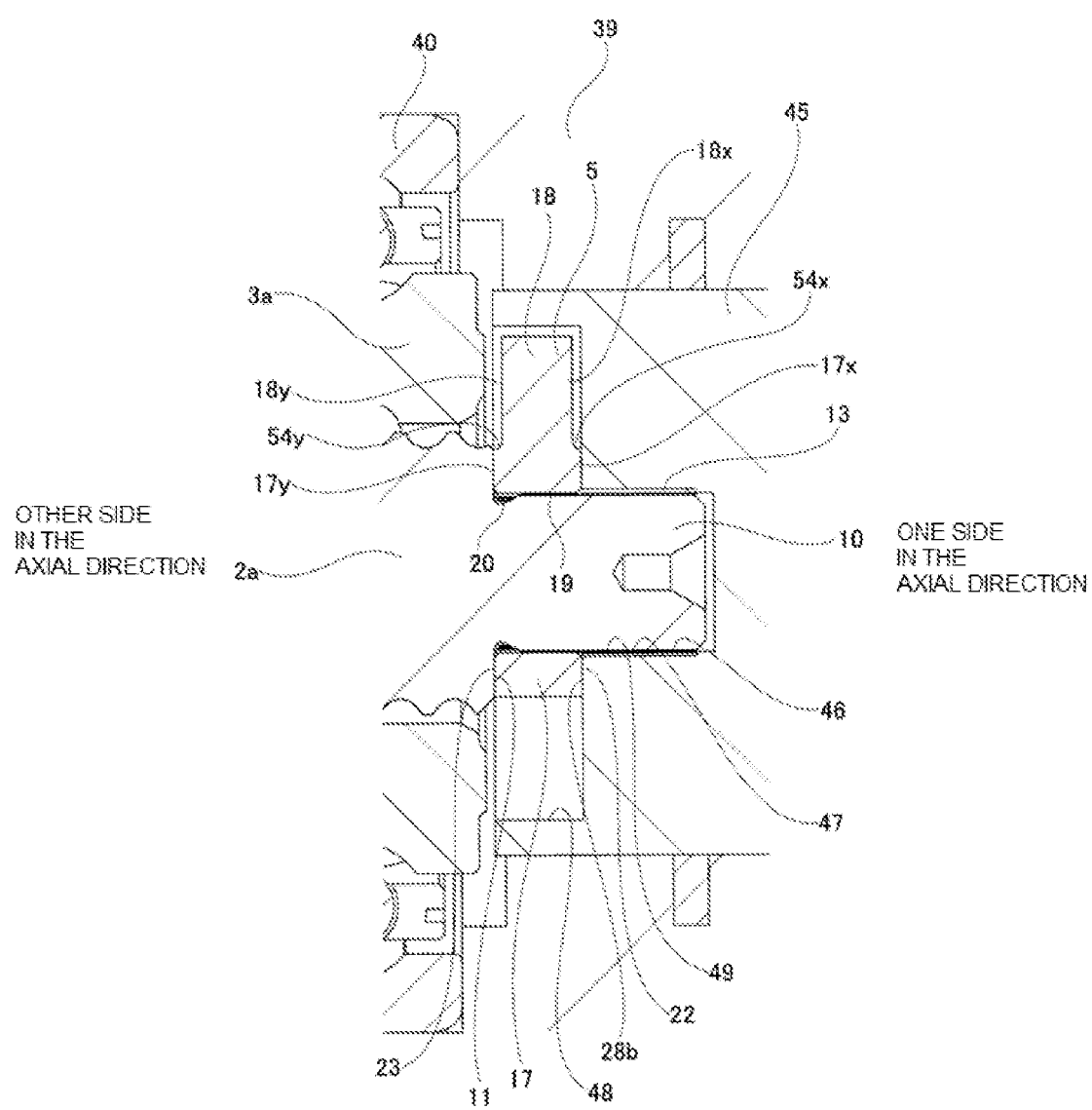
FIG. 21 is a view corresponding to FIG. 3, and illustrates a stopper of the seventh example.
Figure 22:
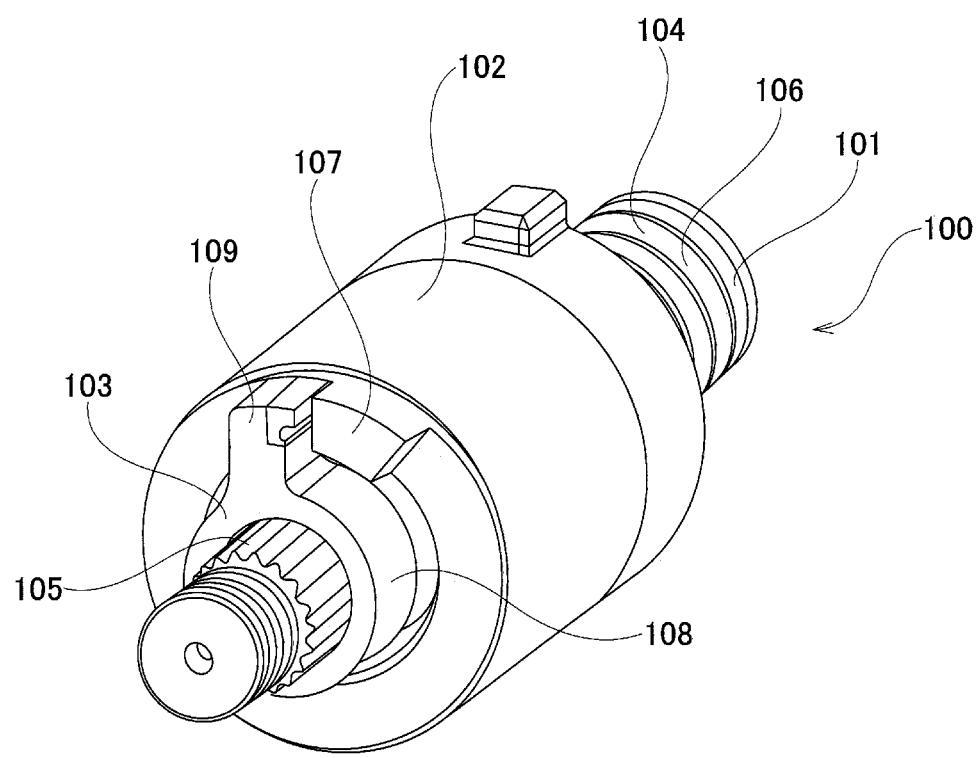
FIG. 22 is a perspective view illustrating a ball screw device of a conventional structure.
Figure 23:
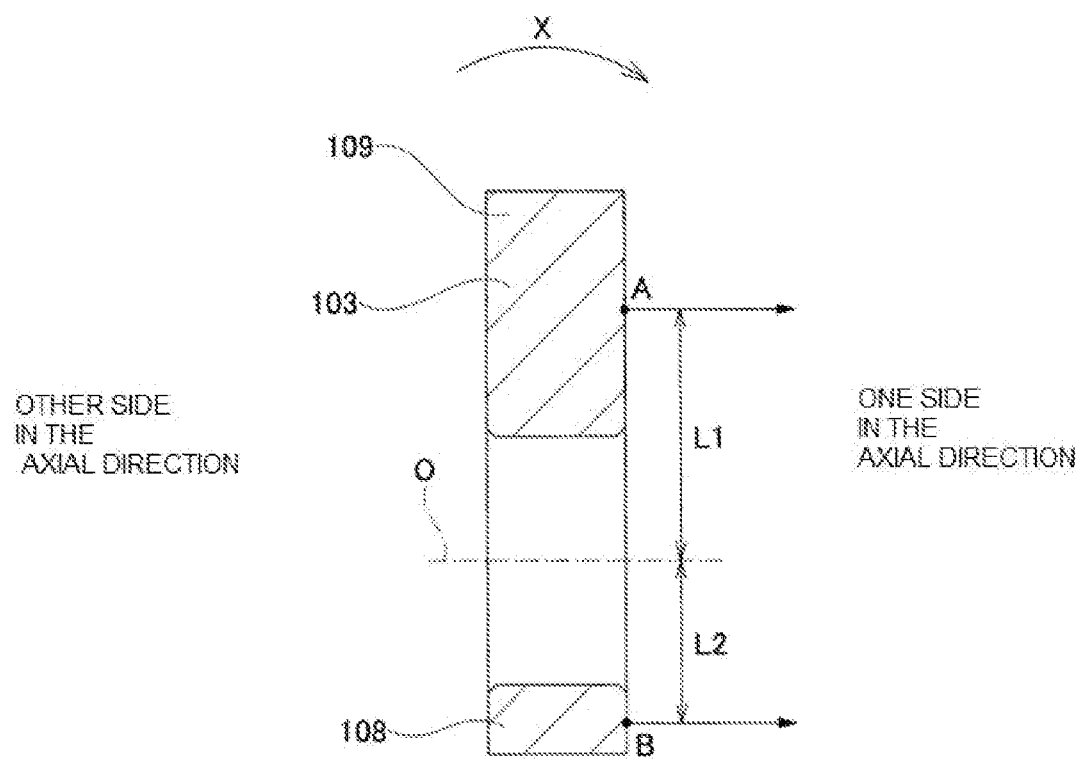
FIG. 23 is a cross-sectional view of a stopper of the ball screw device of the conventional structure, and offering an explanation about a problem of the ball screw device of the conventional structure.

FIGS. 20 and 21 a seventh example of an embodiment of the present invention.

In the ball screw device 1b of this example, the nut 3a constitutes a rotational motion element that rotationally moves during use, and the screw shaft 2a constitutes a linear motion element that linearly moves during use. That is, the ball screw device 1b of this example is used in an aspect in which the nut 3a is rotationally driven and the screw shaft 2a is linearly moved.

For this reason, the nut 3a is rotatably supported by a cylinder 39 having a bottomed cylindrical shape, which is a fixing member, by using a rolling bearing 40. The rolling bearing 40 is internally fixed to a portion on the other side in the axial direction of the cylinder 39, and has an annular outer ring 41 having an outer ring raceway 41a on the inner-circumferential surface, an annular inner ring 42 having an inner ring raceway 42a on the outer-circumferential surface, and rolling elements 43 arranged between the outer ring raceway 41a and the inner ring raceway 42a so as to be able to roll freely. In this example, the inner ring 42 is configured integrally with the nut 3a. That is, the inner ring raceway 42a is directly formed on the outer-circumferential surface of the nut 3a.

The nut 3a has a gear portion 44 at a portion on the other side in the axial direction of the outer-circumferential surface for rotationally driving the nut 3a. Further, the nut 3a has a first engaging portion 15 (not illustrated, see FIG. 4) at an end portion on the one side in the axial direction.

The screw shaft 2a has a screw portion 9 and a fitting shaft portion arranged adjacent to the one side in the axial direction of the screw portion 9. Also in this example, male spline teeth 13 are formed on the outer-circumferential surface of the fitting shaft portion 10.

The stopper 5 has a boss portion 17 and a second engaging portion 18, and has an engaging hole 19, which is a through hole, in the central portion in the radial direction of the boss portion 17. Also in this example, the engaging hole 19 is configured by a spline hole having female spline teeth 20 on the inner-circumferential surface. Further, the fitting shaft portion 10 is loosely spline-engaged with the engaging hole 19 of the boss portion 17 so as to be able to relatively displace in the axial direction. The fitting shaft portion 10 may be spline-fitted into the engaging hole 19 of the boss portion 17 of the stopper in a press-fit state.

In the ball screw device 1b of this example, a piston 45 is used as a holding member such that the stopper 5 is held between the piston 45 and the screw portion 9 in the axial direction.

The piston 45 has a substantially cylindrical shape and is fitted inside cylinder 39 so as to be able to move in the axial direction. The piston has a mounting hole 46 that is open only on a side surface on the other side in the axial direction. The mounting hole 46 is a stepped hole, and has a small diameter hole portion 47 on the one side in the axial direction and a large diameter hole portion 48 on the other side in the axial direction. Female spline teeth 49 are formed on the inner-circumferential surface of the small diameter hole portion 47. The large diameter hole portion 48 has an inner diameter into which the stopper 5 can be inserted. The small diameter hole portion 47 and the large diameter hole portion 48 are connected by an annular surface 28b which is a flat surface facing the other side in the axial direction. The annular surface 28b exists on a virtual plane perpendicular to the center axis of the piston 45.

The piston 45 is externally fitted to the fitting shaft portion 10 so as not to be able to rotate relative to each other by spline-engaging the female spline teeth 49 formed on the inner-circumferential surface of the small diameter hole portion 47 of the mounting hole 46 with the male spline teeth 13 formed on a portion of the fitting shaft portion 10 of the screw shaft 2 that is deviated from the portion where the stopper 5 is externally fitted to the one side in the axial direction. In this example, the piston 45 is spline-engaged with the fitting shaft portion 10 by press fitting.

The stopper 5 is held in the axial direction between the piston 45 and the screw portion 9 by externally fitting and fixing the piston 45 at a position of the fitting shaft portion 10 adjacent to the one side in the axial direction of the stopper 5. As a result, the annular surface 28b provided on the piston 45 is brought into surface contact over the entire circumference with the first contact surface 22 configured by the side surface 17x on the one side in the axial direction of the boss portion 17 of the side surface on the one side in the axial direction of the stopper 5. Further, the stepped surface 11 of the screw portion 9 is brought into surface contact over the entire circumference with the second contact surface 23 configured by the side surface 17y on the other side in the axial direction of the boss portion 17 of the side surface on the other side in the axial direction of the stopper 5. In this state, a gap is formed between the annular surface 28b of the piston 45 and the side surface 18x on the one side in the axial direction of the second engaging portion 18 of the stopper 5. Furthermore, the side surface 18y on the other side in the axial direction of the second engaging portion 18 is arranged so as to retreat from the stepped surface 11 in the axial direction.

The ball screw device 1b of this example transmits an axial load between the screw portion 9 and the piston 45 through the stopper 5. For example, when the nut 3a is rotationally driven in a predetermined direction and the screw shaft 2a is moved to the one side in the axial direction relative to the nut 3a, an axial load directed to the other side in the axial direction is applied to the piston 45 from the liquid or gas arranged inside the cylinder 39. In this example, after the axial load directed to the other side in the axial direction applied to the piston 45 is transmitted from the annular surface 28b of the piston 45 to the first contact surface 22 of the stopper 5, the axial load can be transmitted from the second contact surface 23 of the stopper 5 to the stepped surface 11 of the screw portion 9. Then, the axial load can be supported by the cylinder 39 through the nut 3a. Conversely, as for an axial load directed to the one side in the axial direction applied to the screw portion 9 as well, after the axial load is transmitted from the stepped surface 11 of the screw portion 9 to the second contact surface 23 of the stopper 5, the axial load can be transmitted from the first contact surface 22 of the stopper 5 to the annular surface 28b of the piston 45.

Accordingly, also in this example, an axial load can be transmitted between the screw portion 9 and the piston 45 without shortening the life of the ball screw device 1b. Other configurations and operational effects are the same as in the first example.

Although an embodiment of the present invention has been descried above, the present invention is not limited to this embodiment and can be appropriately modified within a range that does not deviate from the technical ideas of the present invention. Further, the constructions of the first example through the seventh example of an embodiment of the present invention may be appropriately combined and implemented as long as there is no contradiction.

In the first example through the seventh example of an embodiment of the present invention, a driving member, a rolling bearing, or a piston is used as a holding member such that the stopper is held between the holding member and the screw portion. However, in a case of implementing the present invention, the holding member is not limited to these members. Further, although a gear or a pulley is used as a driving member in each example of an embodiment of the present invention, the driving member is not limited to these members, and it is also possible to use a sprocket, a motor shaft directly connected to the screw shaft, a coupling, or the like.

In the first example through the seventh example of an embodiment of the present invention, a construction in which the circulation groove is directly formed on the inner-circumferential surface of the nut has been described. However, in a case of implementing the present invention, it is also possible to form the circulation groove in a circulation component that is separate from the nut, such as a top, and fix the circulation component to the nut. Also, the first engaging portion may be configured separately from the nut, and the second engaging portion may be configured separately from the boss portion.

In the first example through the seventh example of an embodiment of the present invention, a construction in which the nut includes only one first engaging portion and the stopper includes only one second engaging portion has been described. However, in a case of implementing the present invention, it is also possible to provide the same number of the first engaging portions and the second engaging portions (for example, two each).

In the first example through the seventh example of an embodiment of the present invention, a construction in which the first contact surface and the second contact surface are respectively provided only on the side surfaces on both sides in the axial direction of the boss portion among the side surfaces on both sides in the axial direction of the stopper has been described. However, in a case of implementing the present invention, a portion of each of the first contact surface and the second contact surface may be provided on the side surfaces in the axial direction of the second engaging portion. In particular, it can be preferably adopted when a construction including a plurality of second engaging portions is adopted.

REFERENCE SIGNS LIST 1, 1a, 1b Ball screw device
2, 2a Screw shaft
3, 3a Nut
4 Balls
5, 5a-5d Stopper
6 Driving member
7 Load path
8 Circulation groove
9 Screw portion
10, 10a, 10b Fitting shaft portion
11 Stepped surface
12 Shaft-side ball thread groove
13 Male spline teeth
14 Nut-side ball thread groove
15 First engaging portion
16 First stopper surface
17, 17a, 17b Boss portion
17x Side surface on the one side in the axial direction
17y Side surface on the other side in the axial direction
18, 18a, 18b Second engaging portion
18x Side surface on the one side in the axial direction
18y Side surface on the other side in the axial direction
19, 19a, 19b Engaging hole
20 Female spline teeth
21 Second stopper surface
22 First contact surface
23 Second contact surface
24 Disk portion 25 Cylindrical portion
26 Mounting hole
27 Female spline teeth
28, 28a, 28b Annular surface
29 Flat outer surfaces
30 Flat inner surfaces
31 Second fitting shaft portion
32 Engaging concave grooves
33 Engaging claw portions
34 Rolling bearing
35 Outer ring
35a Outer ring raceway
36 Inner ring
36a Inner ring raceway
37 Rolling elements
38 Second stepped surface
39 Cylinder
40 Rolling bearing
41 Outer ring
41a Outer ring raceway
42 Inner ring
42a Inner ring raceway
43 Rolling elements
44 Gear portion
45 Piston
46 Mounting hole
47 Small diameter hole portion
48 Large diameter hole portion
49 Female spline teeth
50 Concave grooves
51 Flat outer surfaces
52 Male spline teeth
53 Concave curved surface
54x, 54y Stepped portion
100 Ball screw device
101 Screw shaft
102 Nut
103 Stopper
104 Screw portion
105 Fitting shaft portion
106 Shaft-side ball thread groove
107 First engaging portion
108 Boss portion
109 Second engaging portion

The invention claimed is:

1. A ball screw device comprising:
a screw shaft including: a screw portion having a shaft-side ball thread groove having a spiral shape on an outer-circumferential surface thereof, and a fitting shaft portion having an outer diameter smaller than an outer diameter of the screw portion and arranged adjacent to one side in an axial direction,
a nut including: a nut-side ball thread groove having a spiral shape on an inner-circumferential surface thereof, and a first engaging portion at an end portion on the one side in the axial direction,
balls arranged between the shaft-side ball thread groove and the nut-side ball thread groove,
a stopper including: a boss portion externally fitted to the fitting shaft portion so as not to be able to rotate relative to each other, and a second engaging portion protruding in a radial direction from an outer-circumferential surface of the boss portion and engageable with the first engaging portion in a circumferential direction, and
a holding member arranged adjacent to the one side in the axial direction of the stopper such that the stopper is held between the holding member and the screw portion in the axial direction, and
the ball screw device transmitting an axial load between the screw portion and the holding member through the stopper without applying a moment to the stopper,
wherein the stopper includes: a first contact surface configured by a flat surface existing on a virtual plane perpendicular to a center axis of the stopper and having a rotationally symmetrical shape in relation to the center axis of the stopper, on a side surface on the one side in the axial direction so as to contact the holding member, and a second contact surface configured by a flat surface existing on a virtual plane perpendicular to the center axis of the stopper and having a rotationally symmetrical shape in relation to the center axis of the stopper, on a side surface on the other side in the axial direction so as to contact the screw portion,
wherein the first contact surface is configured by a side surface on the one side in the axial direction of the boss portion, and the second contact surface is configured by a side surface on the other side in the axial direction of the boss portion, and
wherein a side surface on the one side in the axial direction of the second engaging portion is arranged so as to be shifted in the axial direction to the other side in the axial direction with respect to the side surface on the one side in the axial direction of the boss portion, and a side surface on the other side in the axial direction of the second engaging portion is arranged so as to be shifted in the axial direction to the one side in the axial direction with respect to the side surface on the other side in the axial direction of the boss portion.

2. The ball screw device according to claim 1, wherein the side surface on the one side in the axial direction of the second engaging portion is connected to the side surface on the one side in the axial direction of the boss portion through a stepped portion having an arc-shaped cross section, and the side surface on the other side in the axial direction of the second engaging portion is connected to the side surface on the other side in the axial direction of the boss portion through a stepped portion having an arc-shaped cross section.

3. The ball screw device according to claim 1, wherein an amount of positional deviation of the side surface on the one side in the axial direction of the second engaging portion toward the other side in the axial direction with respect to the side surface on the one side in the axial direction of the boss portion and an amount of positional deviation of the side surface on the other side in the axial direction of the second engaging portion toward the one side in the axial direction with respect to the side surface on the other side in the axial direction of the boss portion are the same as each other.

4. The ball screw device according to claim 1, wherein the second engaging portion has a thickness in the axial direction which is constant over the radial direction.

5. The ball screw device according to claim 1, wherein the thickness in the axial direction of the second engaging portion becomes smaller toward outside in the radial direction.

6. The ball screw device according to claim 1, wherein of both side surfaces in the circumferential direction of the second engaging portion, a side surface on a side that engages with the first engaging portion in the circumferential direction is connected to the outer-circumferential surface of the boss portion through a concave curved surface having an arc-shaped cross section, and a side surface on a side that does not engage with the first engaging portion in the circumferential direction is connected to the outer-circumferential surface of the boss portion in a tangential direction of the boss portion.

7. The ball screw device according to claim 1, wherein the fitting shaft portion includes a pair of flat outer surfaces parallel to each other on an outer-circumferential surface thereof, and
the boss portion has an engaging hole provided with a pair of flat inner surfaces parallel to each other on an inner-circumferential surface thereof.

8. The ball screw device according to claim 1, wherein the fitting shaft portion has male spline teeth on an outer-circumferential surface thereof, and
the boss portion has an engaging hole provided with female spline teeth formed on an inner-circumferential surface thereof.

9. The ball screw device according to claim 1, wherein the stopper is externally fitted to the fitting shaft portion so as to allow relative displacement in the axial direction, and
the holding member is externally fitted to the screw shaft by press fitting.

10. The ball screw device according to claim 1, wherein the stopper is externally fitted to the fitting shaft portion by press fitting, and
the holding member is externally fitted to the screw shaft by press fitting.

11. The ball screw device according to claim 1, wherein the screw shaft is a linear motion element that linearly moves during use,
the nut is a rotational motion element that rotationally moves during use, and
the holding member is a piston that linearly moves together with the screw shaft.

12. A method for manufacturing the ball screw device according to claim 1, comprising steps of:
performing a forging process to a material to form an intermediate material having an shape of the stopper, and
machining each of side surfaces on both sides in an axial direction of the intermediate material to obtain the stopper.

13. The ball screw device according to claim 1, wherein the screw shaft is a rotational motion element that rotationally moves during use,
the nut is a linear motion element that linearly moves during use, and
the holding member is a driving member that rotationally drives the screw shaft or a rolling bearing that rotatably supports the screw shaft.

14. The ball screw device according to claim 13, wherein the driving member is configured by either of a gear, pulley, sprocket, and motor shaft.

* * * * *